United States Patent
Tang et al.

(10) Patent No.: US 11,848,456 B2
(45) Date of Patent: Dec. 19, 2023

(54) BATTERY PACK AND VEHICLE

(71) Applicant: CONTEMPORARY AMPEREX TECHNOLOGY CO., LIMITED, Ningde (CN)

(72) Inventors: Yu Tang, Ningde (CN); Yanbo Chen, Ningde (CN); Zhichao Wang, Ningde (CN); Yongguang Wang, Ningde (CN); Peng Wang, Ningde (CN); Kaijie You, Ningde (CN); Xingdi Chen, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 568 days.

(21) Appl. No.: 17/130,737

(22) Filed: Dec. 22, 2020

(65) Prior Publication Data
US 2021/0111459 A1    Apr. 15, 2021

Related U.S. Application Data

(63) Continuation of application No. PCT/CN2020/107957, filed on Aug. 7, 2020.

(30) Foreign Application Priority Data

Aug. 27, 2019   (CN) .......................... 201910795447.5

(51) Int. Cl.
*H01M 50/209*    (2021.01)
*H01M 50/249*    (2021.01)
(Continued)

(52) U.S. Cl.
CPC ....... *H01M 50/209* (2021.01); *H01M 50/249* (2021.01); *H01M 50/553* (2021.01); *H01M 50/591* (2021.01); *H01M 2220/20* (2013.01)

(58) Field of Classification Search
None
See application file for complete search history.

(56) References Cited

U.S. PATENT DOCUMENTS

| 2018/0342717 A1 | 11/2018 | Shoji et al. |
| 2019/0051882 A1 | 2/2019 | Nakayama et al. |
| 2020/0127253 A1* | 4/2020 | Liu ..................... H01M 50/209 |

FOREIGN PATENT DOCUMENTS

| CN | 102308443 A | 1/2012 |
| CN | 204144356 U | 2/2015 |

(Continued)

OTHER PUBLICATIONS

Search Report for International Patent Application No. PCT/CN2020/107957 (Year: 2020).*

(Continued)

*Primary Examiner* — Wyatt P McConnell
(74) *Attorney, Agent, or Firm* — ANOVA LAW GROUP, PLLC

(57) ABSTRACT

This application discloses a battery pack and a vehicle, including: a case assembly, including an accommodating cavity; a battery module, disposed in the accommodating cavity, wherein the battery module includes a battery cell assembly, where the battery cell assembly includes an output current collector and a plurality of battery cells arranged side by side along a first direction of the battery pack, and the output current collector is configured to output electric energy of the battery cell assembly; and an end plate assembly, including a body plate and a protective cover, where the body plate is located at an end of the battery cell assembly along the first direction, the protective cover is rotatably connected to the body plate, and at least a part of the output current collector is located between the body plate and the protective cover.

20 Claims, 18 Drawing Sheets

(51) Int. Cl.
 H01M 50/591 (2021.01)
 H01M 50/553 (2021.01)

(56) References Cited

FOREIGN PATENT DOCUMENTS

| | | |
|---|---|---|
| CN | 104428919 A | 3/2015 |
| CN | 107068922 A | 8/2017 |
| CN | 206574766 U | 10/2017 |
| CN | 206947426 U | 1/2018 |
| CN | 207818738 U | 9/2018 |
| CN | 207967155 U | 10/2018 |
| CN | 109066924 A | 12/2018 |
| CN | 109473614 A | 3/2019 |
| CN | 109742285 A | 5/2019 |
| CN | 208819951 U | 5/2019 |
| CN | 109950448 A | 6/2019 |
| EP | 2223375 A1 | 9/2010 |
| JP | 2017117574 A | 6/2017 |

OTHER PUBLICATIONS

The World Intellectual Property Organization (WIPO) International Search Report and Written Opinion for PCT/CN2020/106466 dated Oct. 28, 2020 19 pages (including English translation).
The European Patent Office (EPO) Extended Search Report for EP Application No. 20816880.7 dated Aug. 17, 2021 7 Pages.
The European Patent Office (EPO) Intention to grant for EP Application No. 20816880.7 dated May 15, 2023 5 Pages.
The China National Intellectual Property Administration (CNIPA) The First Office Action for Chinese Application 201910795447.5 dated May 21, 2021 14 Pages (With Translation).
The China National Intellectual Property Administration (CNIPA) The Notification to Grant Patent Right for Invention for Chinese Application 201910795447.5 dated Aug. 6, 2021 3 Pages (With Translation).
The China National Intellectual Property Administration (CNIPA) Supplementary Search for Chinese Application 201910795447.5 dated Aug. 6, 2021 2 Pages.
The China National Intellectual Property Administration (CNIPA) First Search for Chinese Application 201910795447.5 dated Aug. 6, 2021 2 Pages.

* cited by examiner

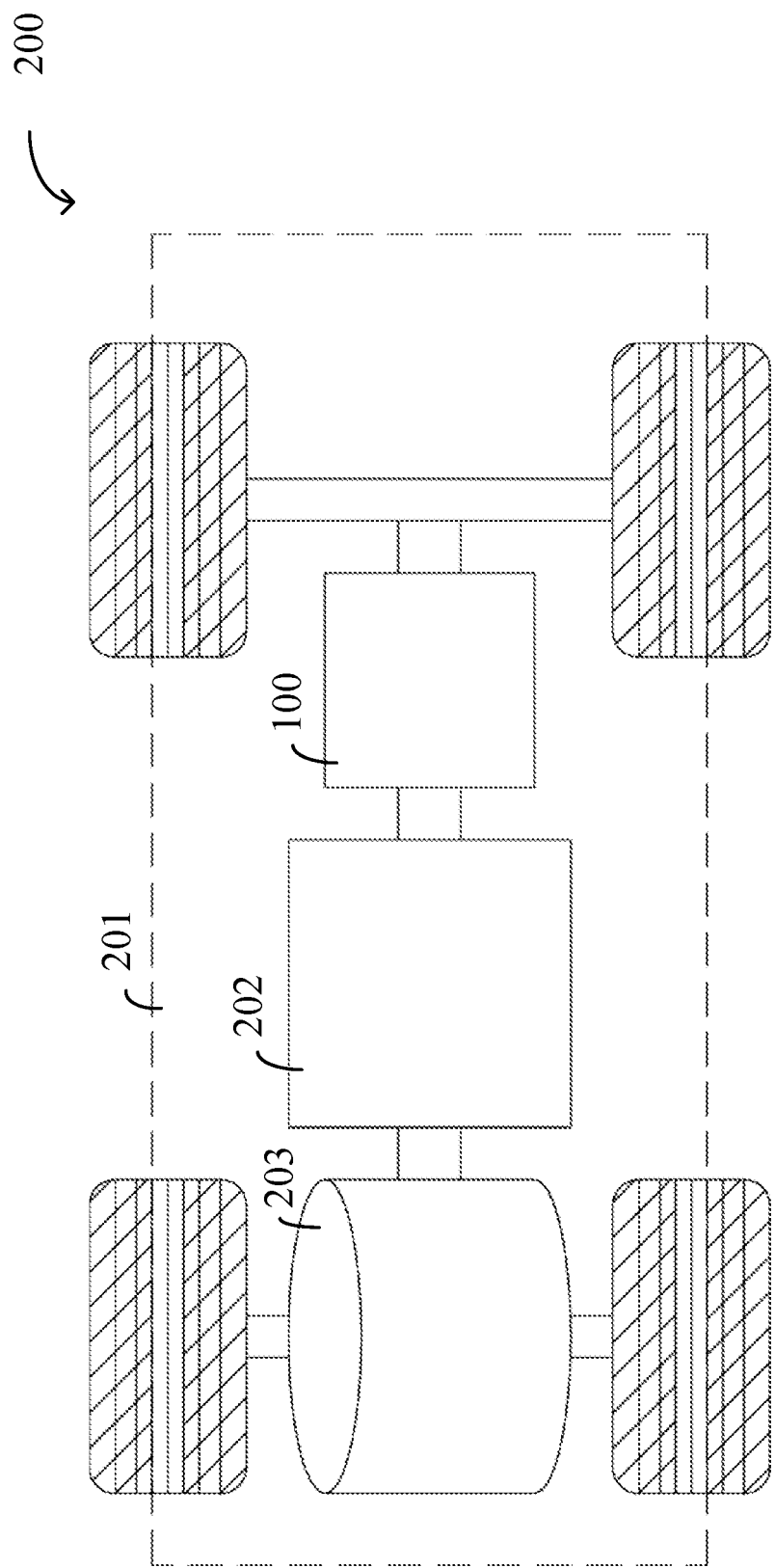

BATTERY PACK AND VEHICLE

CROSS REFERENCE TO RELATED APPLICATIONS

This application is a continuation application of PCT Patent Application No. PCT/CN2020/107957, entitled "BATTERY PACK AND VEHICLE" filed on Aug. 7, 2020, which claims priority to Chinese Patent Application No. 201910795447.5, filed with the State Intellectual Property Office of the People's Republic of China on Aug. 27, 2019, and entitled "BATTERY PACK", all of which are incorporated herein by reference in their entirety.

TECHNICAL FIELD

This application relates to the battery field, and in particular, to a battery pack and a vehicle.

BACKGROUND

A battery module is provided within a case assembly of a battery pack. The battery module includes at least one battery cell assembly. Battery cell assemblies are connected in series and/or in parallel to implement electric performance required by the battery pack.

The battery cell assembly includes an output current collector and a plurality of battery cells, and the output current collector is configured to output electric energy of the battery cell assembly. The output current collector is lead out of the battery cell assembly after assembly. Therefore, to improve safety, a protective cover may be provided to insulate the output current collector.

SUMMARY

This application proposes a battery pack and a vehicle to improve assembly efficiency of the battery pack.

According to one aspect, an embodiment of this application provides a battery pack, including:
 a case assembly, including an accommodating cavity;
 a battery module, disposed in the accommodating cavity, the battery module including a battery cell assembly, the battery cell assembly including an output current collector and a plurality of battery cells arranged side by side along a first direction of the battery pack, and the output current collector is configured to output electric energy of the battery cell assembly; and
 an end plate assembly, including a body plate and a protective cover, the body plate located at an end of the battery cell assembly along the first direction, and the protective cover rotatably connected to the body plate, and at least a part of the output current collector located between the body plate and the protective cover.

In some embodiments, a rotation axis of the protective cover is parallel to a second direction of the battery pack, and the rotation axis is located at an end of the body plate along a third direction, where
 the second direction is perpendicular to the first direction, and the third direction is perpendicular to a plane defined by the first direction and the second direction.

In some embodiments, a first end of the output current collector is connected to an electrode terminal of a battery cell adjacent to the end plate assembly, and a second end of the output current collector is bent to a side of the body plate facing away from the battery module; and
 the protective cover is disposed at an end of the body plate near the output current collector along the second direction of the battery pack, and covers the part of the output current collector bent to the side of the body plate facing away from the battery module, and the second direction is perpendicular to the first direction.

In some embodiments, a buckle part is disposed between the protective cover and the body plate to fasten the protective cover to the body plate when the buckle part is rotated to a buckled state.

In some embodiments, the protective cover and the body plate are integrally formed through injection molding, and a thinned portion is provided at a junction of the protective cover and the body plate to form a rotatable connection of the protective cover relative to the body plate.

In some embodiments, the battery pack further includes:
 a plurality of battery modules; and
 a connecting current collector, each end of the connecting current collector electrically connected to output current collectors of a respective one of the plurality of battery modules,
 an opening provided on a first side of the protective cover along the second direction of the battery pack, closure implemented between a second side of the protective cover along the second direction of the battery pack and the body plate, the opening forming a channel for leading out the connecting current collector, and the second direction being perpendicular to the first direction.

In some embodiments, the battery cell assembly includes two layers of battery cells disposed along the third direction, the output current collector includes a first output current collector and a second output current collector disposed on an end of a first layer of battery cells and an end of a second layer of battery cells close to the end plate assembly, respectively, the third direction is perpendicular to the plane defined by the first direction and the second direction, and the second direction is perpendicular to the first direction; and
 the protective cover includes:
 a first protective cover, rotatably connected to a first end of the body plate along the third direction, to cover at least a part of the first output current collector in a buckled state; and
 a second protective cover, rotatably connected to a second end of the body plate along the third direction, to cover at least a part of the second output current collector in a buckled state, where
 the first protective cover and the second protective cover can be oppositely opened outward in the third direction.

In some embodiments, the battery pack further includes a plurality of connecting current collectors and a plurality of battery modules, wherein the plurality of connecting current collectors include:
 a first connecting current collector, configured to connect first output current collectors of the two battery modules; and
 a second connecting current collector, configured to connect second output current collectors of the two battery modules, where
 the first connecting current collector and the second connecting current collector are led out in opposite polarities of the second direction.

In some embodiments, the battery pack further includes a first fastener, and the first output current collector includes:

a first portion, connected to an electrode terminal of the first layer of battery cells adjacent to the end plate assembly;

a second portion, connected to an end of the first portion close to the end plate assembly along the first direction, and abutting against an outer surface of the body plate; and a third portion, connected to an end of the second portion close to the second output current collector along the third direction and extending outward horizontally, the third portion and the first connecting current collector being stacked and fastened to the body plate through the first fastener along the third direction, so that the first connecting current collector extends in a plane perpendicular to the third direction.

In some embodiments, the battery pack further includes a second fastener, and the second output current collector includes:

a first portion, connected to an electrode terminal of the second layer of battery cells adjacent to the end plate assembly; and a second portion, connected to an end of the first portion close to the end plate assembly along the first direction, and abutting against an outer surface of the body plate;

the second portion and the second connecting current collector being stacked and fastened to the body plate through the second fastener along the first direction, so that the second connecting current collector extends in a plane perpendicular to the first direction.

In some embodiments, the battery pack further includes:

a cooling plate, abutting against a surface of the battery cell assembly facing away from the electrode terminals of the battery cell to cool each battery cell of the battery cell assembly; and a connection pipe, connected to the cooling plate to supply cooling fluid to the cooling plate, where the connection pipe is on a side of the body plate facing away from the battery module, the end plate assembly further including a first buckle, and the first buckle being integrally formed with the body plate to fasten the connection pipe.

In some embodiments, the first buckle is disposed on the body plate along the second direction, and is on a side of the protective cover facing away from the output current collector, the protective cover is of an L-shaped structure on the whole, the connection pipe extends along the second direction and passes through a space formed by an outer L-shaped structure of the protective cover, and the second direction is perpendicular to the first direction.

In some embodiments, an opening of the first buckle faces the body plate.

In some embodiments, the battery pack further includes a plurality of connecting current collectors and a plurality of battery modules, and the connecting current collector is configured to electrically connect output current collectors of two battery modules; and the cooling plate is provided with a notch at a location through which the connecting current collector passes, and a bending portion is disposed at a location, on the connecting current collector, corresponding to the cooling plate, and the bending portion passes through the notch.

In some embodiments, the battery pack further includes a plurality of connecting current collectors and a plurality of battery modules, and the connecting current collector is configured to electrically connect output current collectors of two battery modules; and a first groove is provided in a surface of the body plate facing away from the battery module, and at least a part of one connecting current collector is located within the first groove, and the end plate assembly further includes:

a second buckle, disposed on a side wall of the first groove to fasten the connecting current collector to the body plate.

In some embodiments, the end plate assembly further includes:

a first support portion, disposed on an inner wall of the first groove perpendicular to the first direction; and a third fastener, configured to fasten the connecting current collector to the first support portion.

In some embodiments, the end plate assembly further includes:

a second support portion, disposed on an inner wall on at least one side of the first groove along the third direction, where the second direction is perpendicular to the first direction, and the third direction is perpendicular to a plane defined by the first direction and the second direction, where the connecting current collector abuts against the second support portion in the third direction.

In some embodiments, the battery module includes a connector and a lead-out harness, and the connector is connected to an end of the lead harness; and the end plate assembly further includes:

a third buckle, integrally formed with the body plate to fasten the connector to the body plate.

In some embodiments, a second groove is provided in a side surface of the body plate facing towards the battery module.

According to another aspect, an embodiment of this application further provides a vehicle, where the vehicle includes a body and the foregoing battery pack, and the battery pack is disposed within the body.

BRIEF DESCRIPTION OF DRAWINGS

The drawings described herein are intended for a further understanding of this application and constitute a part of this application. Example embodiments of this application and descriptions thereof are intended to explain this application, and do not constitute any inappropriate limitation on this application. In the drawings:

FIG. 18 is a schematic diagram of an internal structure of some embodiments of a vehicle according to this application.

DESCRIPTION OF EMBODIMENTS

Figure 1:
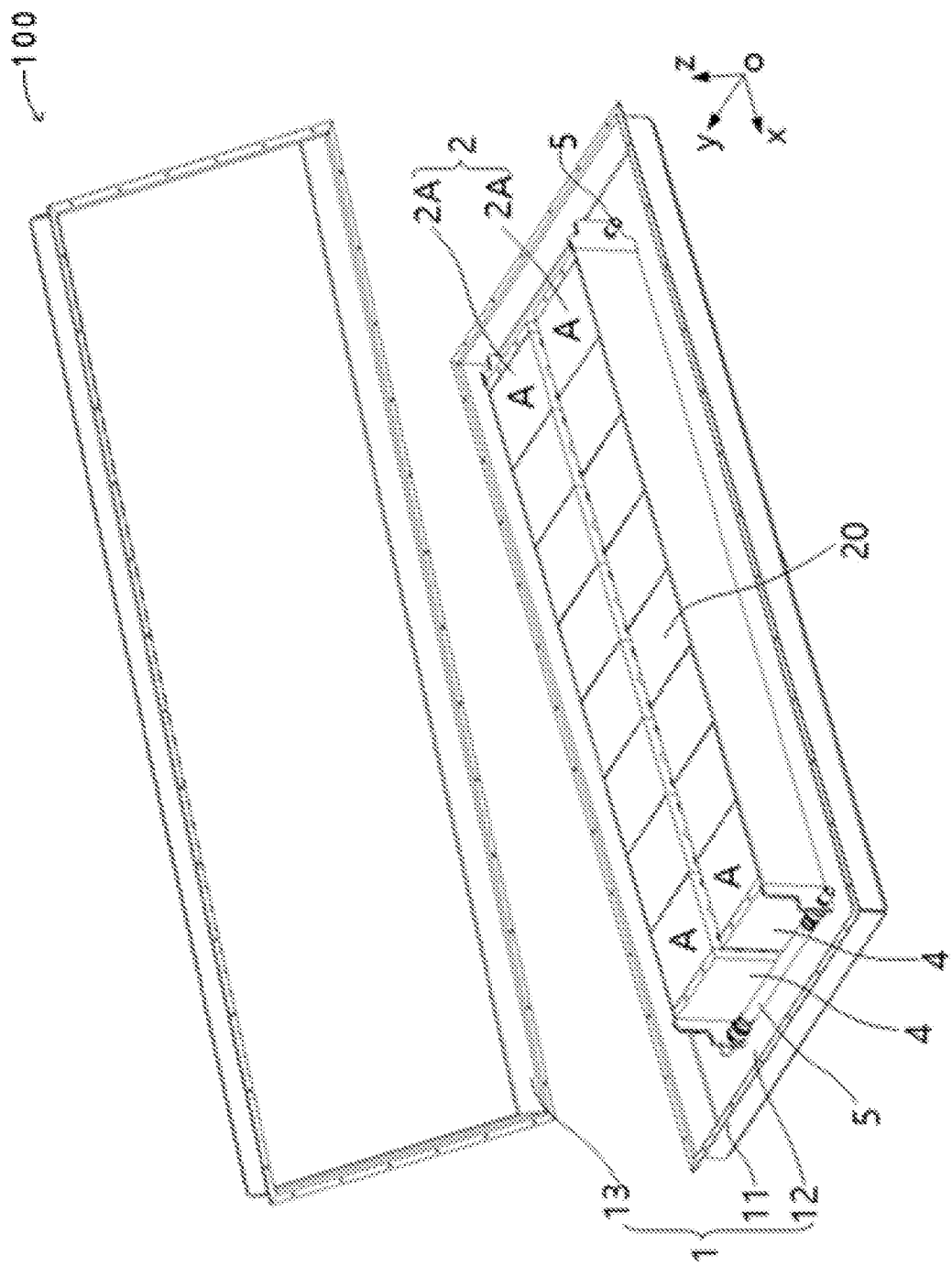
FIG. 1 is a schematic diagram of an internal structure of some embodiments of a battery pack according to this application.

This application is detailed below. In the following paragraphs, different aspects of the embodiments are defined in more detail. The aspects defined may be combined with one or more of any other aspects, unless otherwise explicitly specified. In particular, any feature considered to be preferable or advantageous may be combined with one or more other features considered to be preferable or advantageous.

The terms such as "first" and "second" in this application are used only for convenience of description, to distinguish different components with a same name, but do not indicate a sequential or primary-secondary relationship.

In addition, when an element is referred to as being "on" another element, the element may be directly on the other element, or may be indirectly on the other element with one or more intermediate components disposed in between. In addition, when an element is referred to as being "connected to" another element, the element may be directly connected to the other element, or may be indirectly connected to the other element with one or more intermediate components disposed in between. In the following, a same reference numeral denotes a same element.

In this application, "a plurality of" means two (inclusive) or more. Similarly, "a plurality of groups" means two (inclusive) or more groups, and "a plurality of pieces" means two (inclusive) or more pieces.

To clearly describe orientations in the following embodiments, for example, a coordinate system in FIG. 1 defines directions of a battery pack. An x direction represents a length direction of the battery pack (hereinafter referred to as the length direction); a y direction represents a width direction of the battery pack (hereinafter referred to as the width direction); a z direction is perpendicular to a plane formed by the x and y directions, and represents a height direction of the battery pack (hereinafter referred to as the height direction). Based on this definition of orientations, "upper", "lower", "top", and "bottom" are used and are all relative to the height direction.

After an output current collector is fastened to an existing end plate, a protective cover needs to be additionally installed on the end plate. Many parts need to be assembled and are prone to loss, resulting in relatively low assembly efficiency of a battery pack.

Battery cells 20 of a battery cell assembly 2A may be arranged along the length direction or the width direction of the battery pack. Therefore, for ease of description, a first direction, a second direction, and a third direction are defined. The second direction is perpendicular to the first direction, and the third direction is perpendicular to a plane formed by the first direction and the second direction. When the first direction is the length direction, the second direction is the width direction, and the third direction is the height direction; when the first direction is the width direction, the second direction is the length direction, and the third direction is the height direction.

As shown in FIG. 1 to FIG. 17, an embodiment of this application provides a battery pack 100. In some embodiments, the battery pack 100 includes a case assembly 1, a battery module 2, and an end plate assembly 3.

As shown in FIG. 1, the case assembly 1 includes a case 11 and an outer cover 13, and the case 11 and the outer cover 13 enclose an accommodating cavity 12. The outer cover 13 may be located above the case 11. The outer cover 13 and the case 11 are interlocked to form a sealed connection to prevent external liquid and water vapor from entering the battery pack 100, improving safety performance of the battery pack 100. The case 11 and the outer cover 13 may be connected by using a bolt or another detachable connection method, to facilitate installation, replacement, and maintenance of various components in the accommodating cavity 12, and make manufacturing and processing of the case assembly 1 easier.

Still referring to FIG. 1, the battery module 2 is disposed in the accommodating cavity 12. The battery module 2 and the case assembly 1 are detachably connected. For example, a connecting frame is installed on an inner wall of the case assembly 1, a connecting piece is disposed on the battery module 2, and the connecting frame and the connecting piece are detachably connected by using a bolt or the like. This installation manner allows the battery module 2 to be securely connected to the case assembly 1, thereby improving structural reliability of the battery pack 100. The battery module 2 and the case assembly 1 may alternatively be connected by using fixing glue, that is, the battery module 2 is glued to the case 11.

As shown in FIG. 1, the battery module 2 includes at least one battery cell assembly 2A, and battery cell assemblies 2A are electrically connected in series, parallel, or both series and parallel as required. In this way, electric performance required by the battery pack 100 can be implemented.

On a plane (xy plane) formed by a first direction and a second direction, two adjacent battery cell assemblies 2A may be installed, with electrode terminals 242 facing towards each other. A safe distance needs to be left between the electrode terminals 242 of the two adjacent battery cell assemblies 2A. When cooling is required, a cooling plate 4 may be disposed on sides of the two battery cell assemblies 2A facing away from the electrode terminals 242. Alternatively, two adjacent battery cell assemblies 2A may be installed, with electrode terminals 242 facing away from each other to reduce an installation space. When a cooling plate 4 is installed, the cooling plate 4 may be disposed between the two adjacent battery cell assemblies 2A, so as to simultaneously cool the two adjacent battery cell assemblies 2A by using one cooling plate 4.

The battery cell assembly 2A includes an output current collector 22 and a plurality of battery cells 20 arranged side by side along the first direction of the battery pack 100. The first direction may be a length direction or a width direction. A largest side surface A of each battery cell 20 may be approximately parallel to a bottom surface of the case 11, and this placement is also referred to as horizontal placement. The battery cell assembly 2A is relatively short in a height direction, and an overall height of the battery pack 100 can be reduced through horizontal arrangement. This is more suitable for a vehicle with a relatively small installation space for the battery pack 100. The output current collector 22 is configured to output electric energy of the battery cell assembly 2A, and can output voltage and/or current.

For example, in FIG. 1, a plurality of battery cells 20 of one battery cell assembly 2A are arranged side by side along the length direction (x direction). Two rows of battery cell assemblies 2A are disposed in the width direction (x direction). In actual application, three or more rows may alternatively be disposed. In the height direction (z direction), one or more layers of battery cell assemblies 2A may also be disposed, and each layer of battery cell assemblies 21 may be stacked in the height direction.

Figure 3:
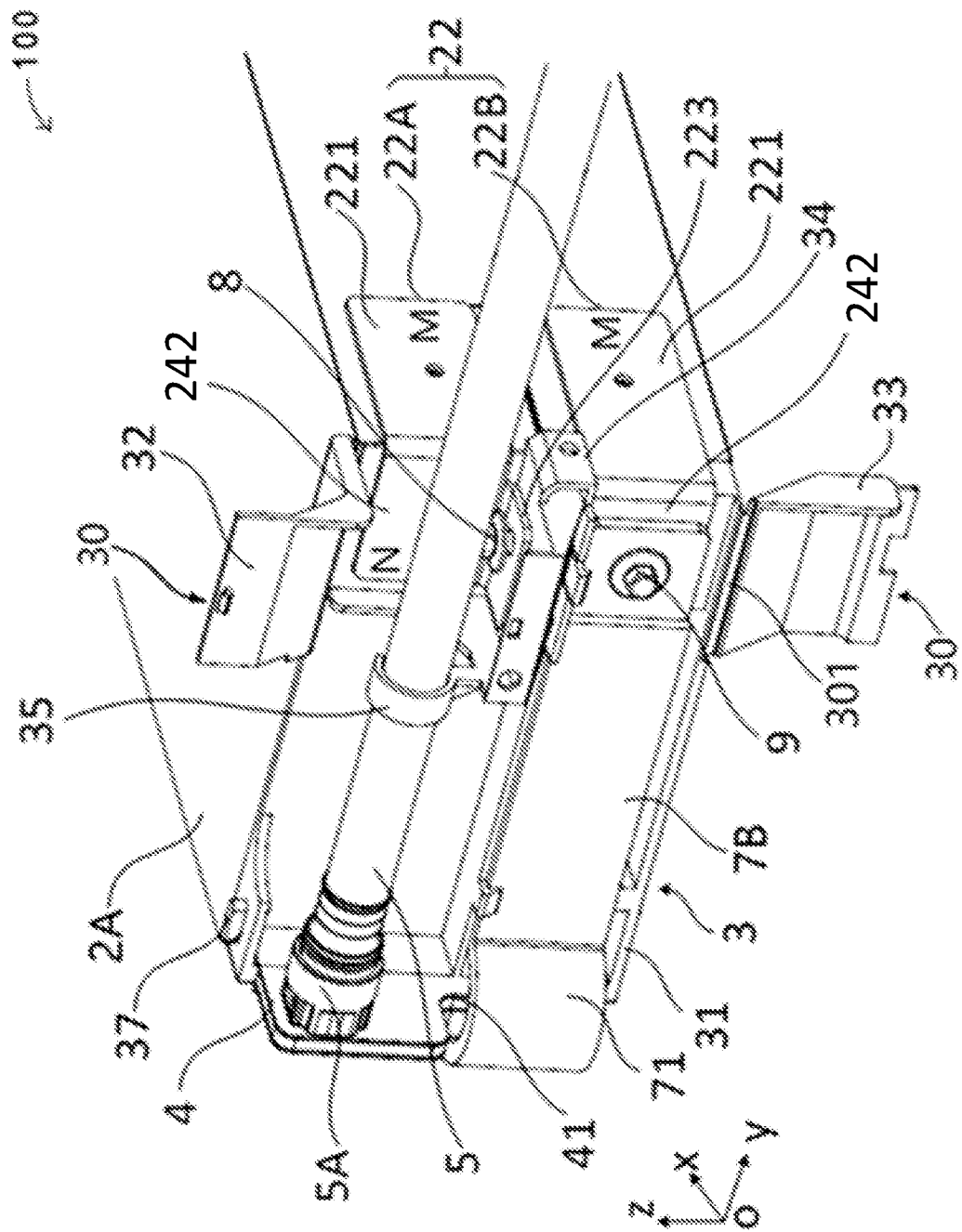
FIG. 3 is a schematic diagram of a protective cover in an open state when an end plate assembly of a battery pack is installed on a battery cell assembly according to this application.
Figure 4:
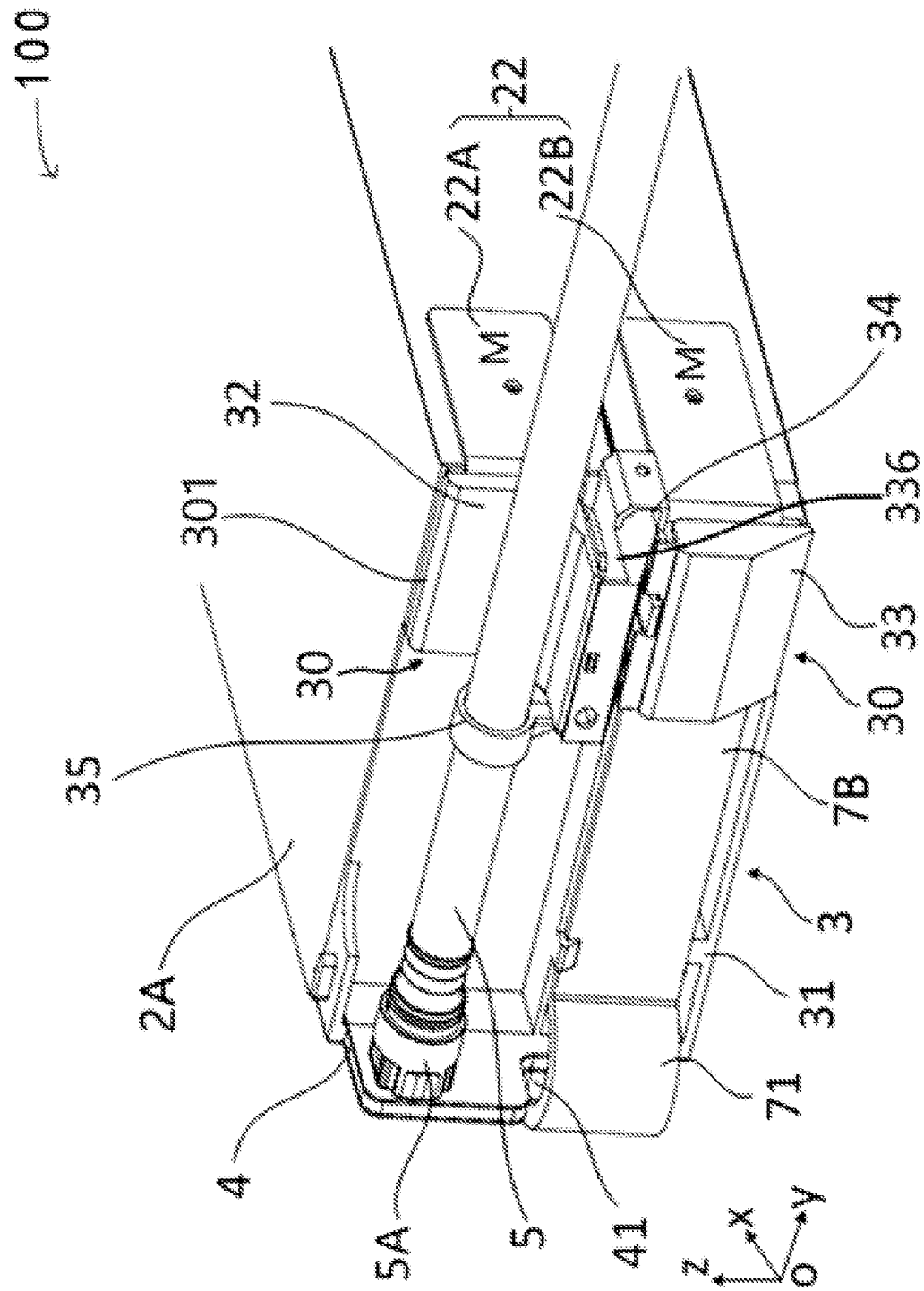
FIG. 4 is a schematic diagram of a protective cover in a buckled state when an end plate assembly of a battery pack is installed on a battery cell assembly according to this application.

As shown in FIGS. 3 and 4, the end plate assembly 3 includes a body plate 31 and a protective cover 30. The body plate 31 is located at an end of the battery cell assembly 2A along the first direction, and configured to limit the battery cell assembly 2A and cover an end of the battery cell assembly 2A. The protective cover 30 is rotatably connected to the body plate 31. At least one protective cover 30 is disposed, and a quantity of protective covers 30 may correspond to a quantity of output current collectors 22. At least a part of the output current collector 22 is located between the body plate 31 and the protective cover 30. The protective cover 30 has an open state and a buckled state. In the open state, referring to FIG. 3, the protective cover 30 allows the output current collector 22 to be fastened to the body plate; in the buckled state, referring to FIG. 4, the protective cover 30 covers at least a part of the output current collector 22.

For example, the protective cover 30 may be made of insulating materials such as plastic or rubber to insulate and protect the output current collector 22. In addition, when a plurality of output current collectors 22 are disposed, a creepage distance between the output current collectors 22 can be increased. In addition, the protective cover 30 can prevent an operator from accidentally touching the output current collector 22 to protect safety of the operator.

In addition to limiting the battery module, this type of end plate assembly also integrates the function of protecting the output current collector. Therefore, additional structural parts are not required, which reduces the risk of failure in multi-part assembly, increases reliability of an overall structure of the battery module, simplifies an assembly process, and improves assembly efficiency of the battery pack 100.

Those skilled in the art can rotatably dispose the protective cover 30 on the body plate 31 in at least two ways.

In one structure, as shown in FIGS. 3 and 4, the protective cover 30 and the body plate 31 are of an integral structure. Specifically, the protective cover 30 and the body plate 31 are integrally formed through injection molding, and a thinned portion 301 is provided at a junction of the protective cover 30 and the body plate 31 to form a rotatable connection of the protective cover 30 relative to the body plate 31. This structure is secure and simple to process because a process of assembling the protective cover 30 on the body plate 31 is not required. In addition, a metal shaft is not required at a rotatory junction, further improving insulation reliability.

In another structure not shown in the figure, the protective cover 30 is hinged to the body plate 31 through a rotating shaft. To improve rotation flexibility, the rotating shaft may be a metal or fluoroplastic rotating shaft. Before the battery pack 100 is assembled, the protective cover 30 may be pre-assembled on the body plate 31. With this structure, protective covers 30 of different volumes and shapes may be installed as required to adapt to different output current collectors 22. Moreover, when the protective cover 30 is damaged, the protective cover 30 may be separately replaced without disassembling other structural parts of the end plate assembly 3.

As shown in FIG. 3, a rotation axis of the protective cover 30 is consistent with the second direction of the battery pack 100, and the rotation axis is at an end of the body plate 31 in the third direction (z direction). Therefore, the protective cover 30 can be turned outwards to prevent interference with other components outside the body plate 31 during rotation, so that the end plate assembly 3 integrates more functions.

For clear description of a connection relationship between the output current collector 22 and the battery cell assembly 2A, a structure of the battery cell 20 is described first.

Figure 15:
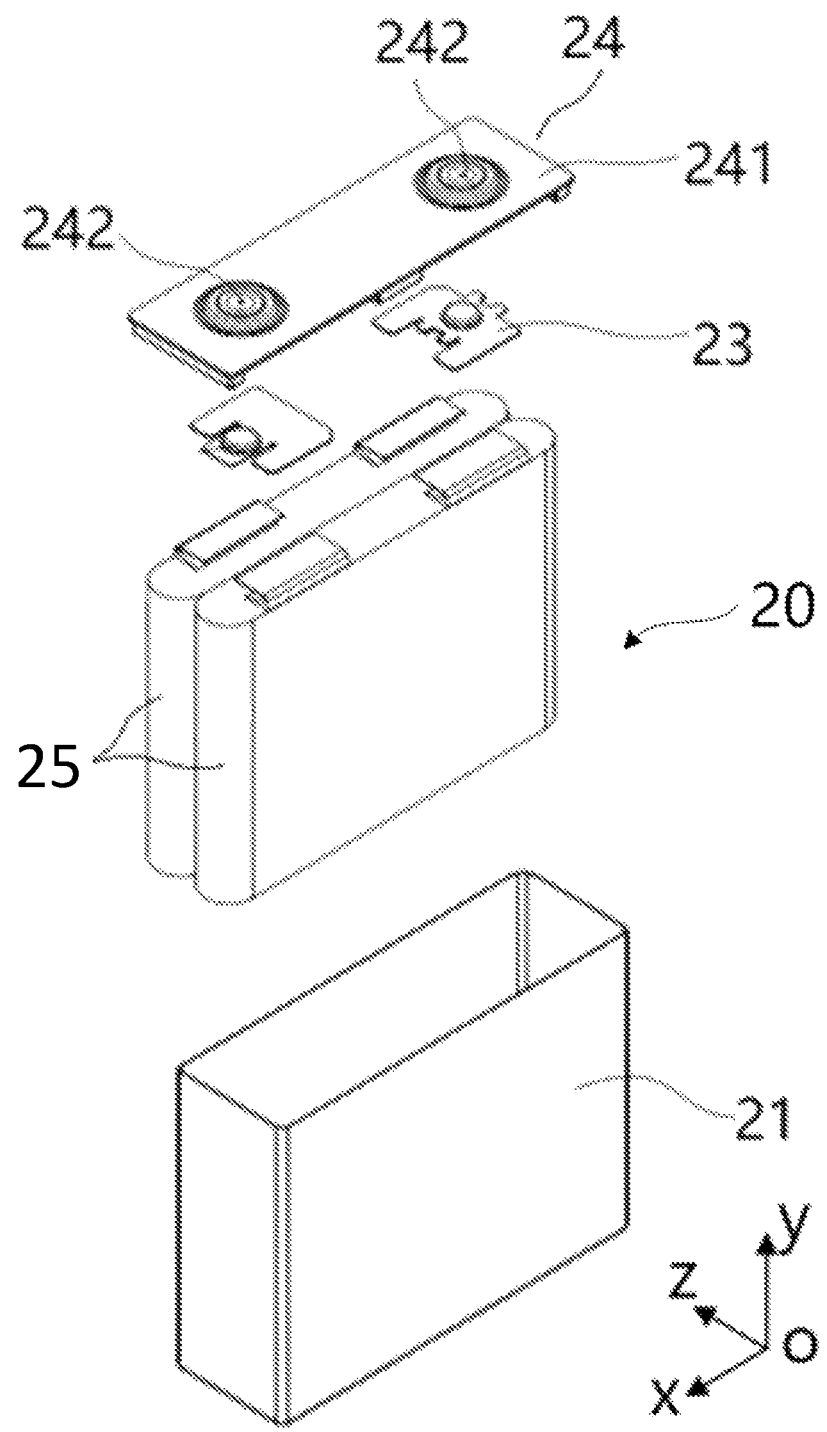
FIG. 15 is a schematic exploded diagram of an embodiment of a battery cell of a battery pack.

As shown in the schematic exploded view in FIG. 15, each battery cell 20 includes a housing 21 and an electrode assembly 25 disposed in the housing 21. The housing 21 may be of a hexahedral shape or another shape, and has an opening. The electrode assembly 25 is accommodated in the housing 21. The opening of the housing 21 is covered with a cover plate assembly 24. The cover plate assembly 24 includes a cover plate 241 and two electrode terminals disposed on the cover plate. The two electrode terminals are a first electrode terminal 242 and a second electrode terminal 243. The first electrode terminal 242 may be a positive electrode terminal, and the second electrode terminal 243 is a negative electrode terminal. In another embodiment, the first electrode terminal 242 may be a negative electrode terminal, and the second electrode terminal 243 is a positive electrode terminal. An adapting sheet 23 is disposed between the cover plate assembly 24 and the electrode assembly 25, and a tab of the electrode assembly 25 is electrically connected to the electrode terminal of the cover plate 241 through the adapting sheet 23. In this embodiment, there are two adapting sheets 23, namely, a positive electrode adapting sheet and a negative electrode adapting sheet.

As shown in FIG. 15, two electrode assemblies 25 are disposed in the housing 21, and the two electrode assemblies 25 are stacked along a height direction (z direction) of the battery cell 2. The height direction of the battery cell 2 is the same as the height direction of the battery pack 100. Certainly, in another embodiment, one electrode assembly 25 may be disposed in the housing 21, or more than three electrode assemblies 25 may be disposed in the housing 21. The plurality of electrode assemblies 25 are stacked in the height direction (z direction) of the battery cell 2.

Figure 16:
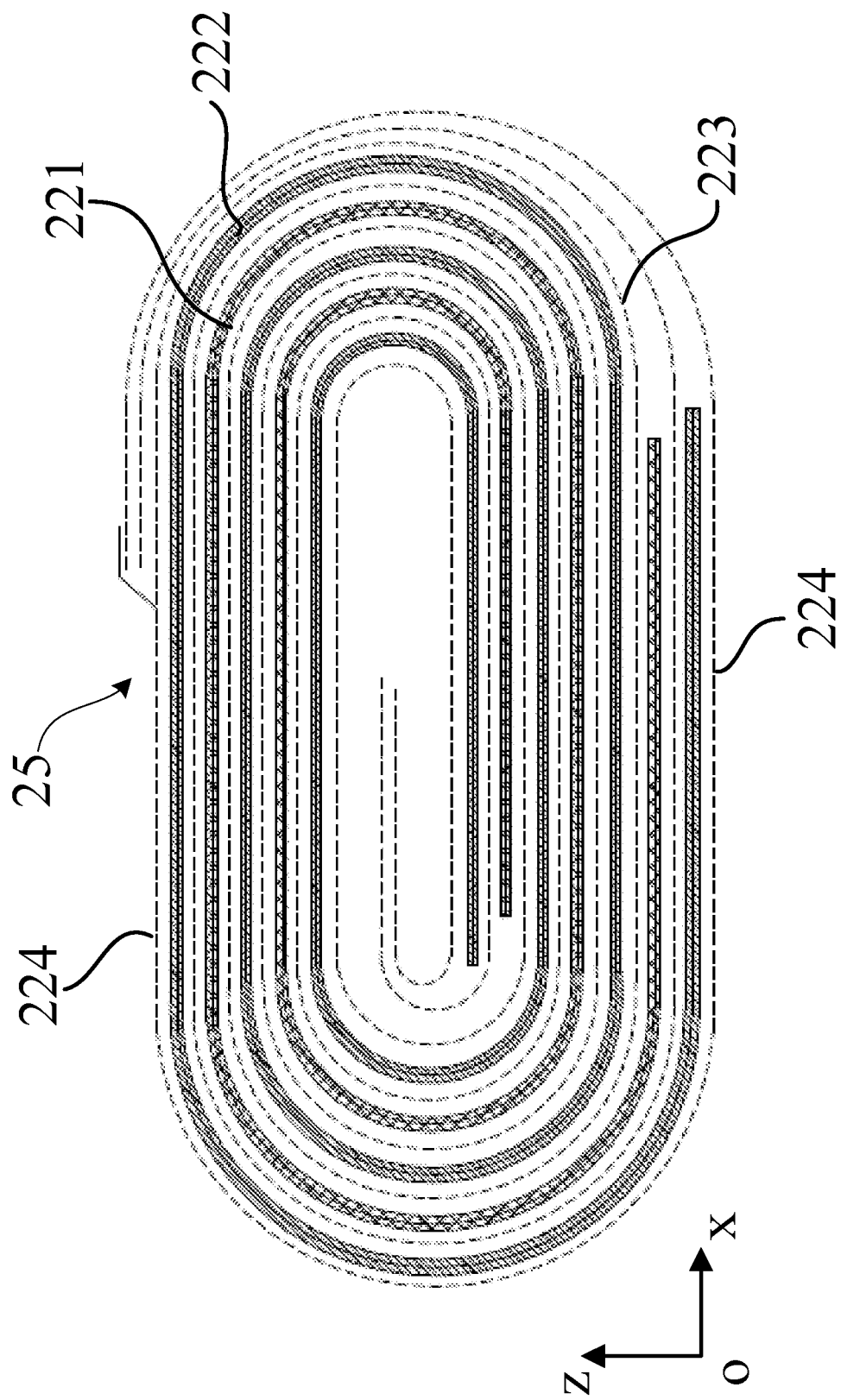
FIG. 16 is a cross-sectional view of a battery cell using a wound electrode assembly along an xz plane.
Figure 17:
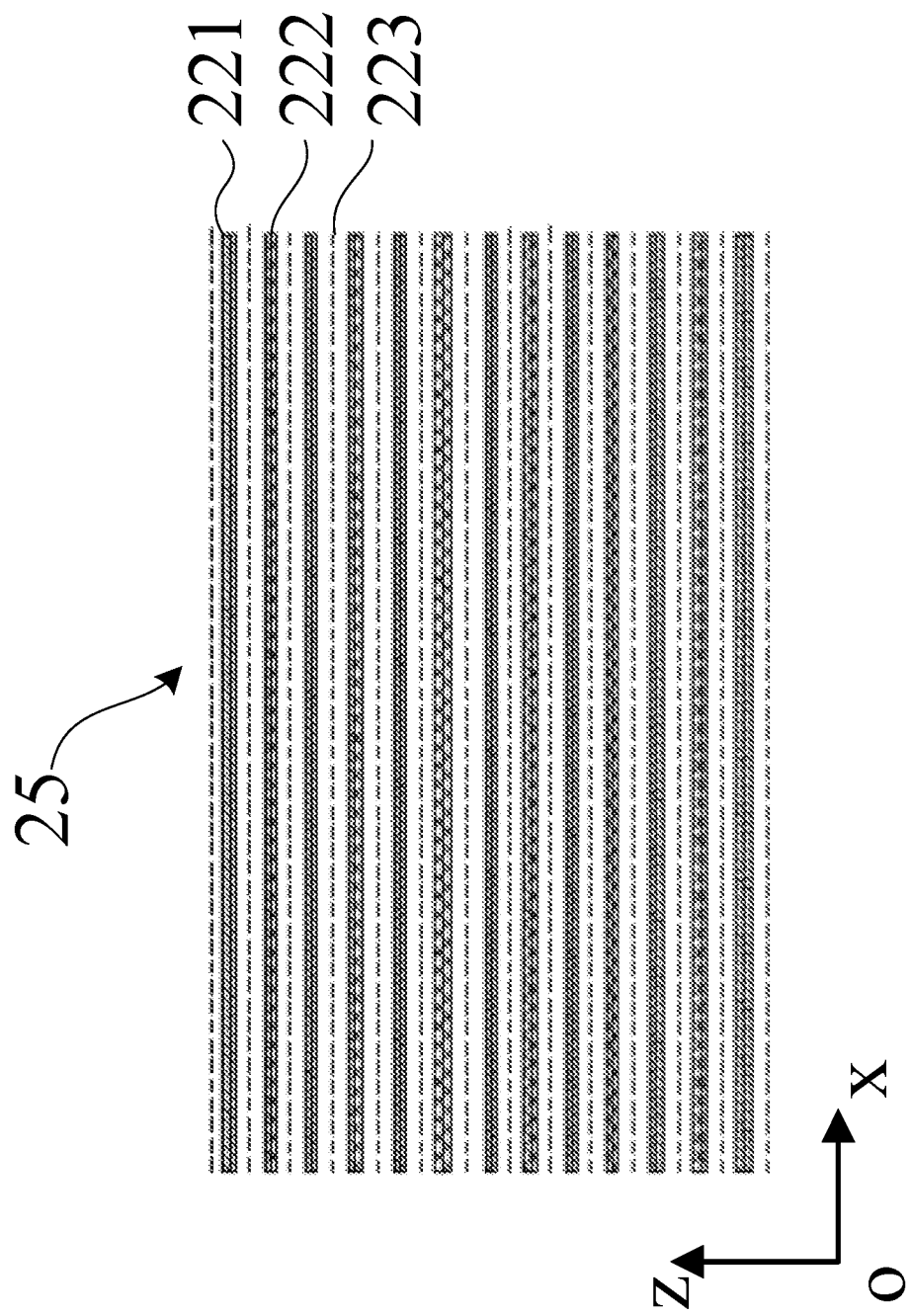
FIG. 17 is a cross-sectional view of a battery cell using a stacked electrode assembly along an xz plane.

As shown in FIGS. 16 and 17, the electrode assembly 25 includes a first electrode plate 221, a second electrode plate 222, and a separator 223 disposed between the first electrode plate 221 and the second electrode plate 222. The first electrode plate 221 may be a positive electrode plate, and the second electrode plate 222 is a negative electrode plate. In another embodiment, the first electrode plate 221 may be a negative electrode plate, and the second electrode plate 222 is a positive electrode plate. The separator 223 is an insulator between the first electrode plate 221 and the second electrode plate 222. An active material of the positive electrode plate may be coated on a coating area of the positive electrode plate, and an active material of the negative electrode plate may be coated on a coating area of the negative electrode plate. A part extending from the coating area of the positive electrode plate serves as a positive tab; a part extending from the coating area of the negative electrode plate serves as a negative tab. The positive tab is connected to a positive electrode terminal of the cover plate assembly 24 through the positive adapting sheet. Similarly, the negative tab is connected to a negative electrode terminal of the cover plate assembly 24 through the negative electrode adapting sheet.

As shown in FIG. 16, the electrode assembly 25 is of a wound structure. The first electrode plate 221, the separator 223, and the second electrode plate 222 are all of a strip structure. The first electrode plate 221, the separator 223, and the second electrode plate 222 are sequentially stacked and wound two times to form the electrode assembly 25. In addition, the electrode assembly 25 is of a flat shape. When being manufactured, the electrode assembly 25 may be directly wound into a flat shape, or may be wound into a hollow cylindrical structure first, and then flattened into a flat shape. FIG. 15 is a schematic diagram of an outline of the electrode assembly 25. An outer surface of the electrode assembly 25 includes two flat surfaces 224, and the two flat surfaces 224 are oppositely disposed along the height direction (z direction) of the battery cell 2. The electrode assembly 25 is substantially of a hexahedral structure, and the flat surfaces 224 are substantially parallel to a winding axis and are outer surfaces with a largest area. The flat surface 224 may be a relatively flat surface, and is not required to be a completely flat surface.

As shown in FIG. 17, the electrode assembly 25 is of a stacked structure, that is, the electrode assembly 25 includes a plurality of first electrode plates 221 and a plurality of second electrode plates 222, and the separator 223 is disposed between the first electrode plate 221 and the second electrode plate 222. The first electrode plate 221 and the second electrode plate 222 are stacked along the height direction (z direction) of the battery cell 2.

Next, as shown in FIG. 3, a first end M of the output current collector 22 is connected to an electrode terminal 242 of a battery cell 20 adjacent to the end plate assembly 3, and a second end N of the output current collector 22 is bent to a side of the body plate 31 facing away from the battery module 2. The protective cover 30 is disposed at an end of the body plate 31 near the output current collector 22 along the second direction of the battery pack 100, and covers the part of the output current collector 22 bent to the side of the body plate 31 facing away from the battery module 2.

When the protective cover 30 is disposed at the end of the body plate 31 near the output current collector 22 along the second direction, and covers the part of the output current collector 22 bent to the side of the body plate 31 facing away from the battery module 2, a volume of the protective cover 30 can be reduced. This not only saves materials, but also leaves room for the end plate assembly 3 to integrate other structural parts. Moreover, disposing the protective cover 30 at end locations along both the second direction and the third direction allows the protective cover to be located at a corner location of the body plate 31, so as to leave as much space as possible for the end plate assembly 3 to integrate other structural parts when at least a part of the output current collector 22 is covered.

Figure 5:
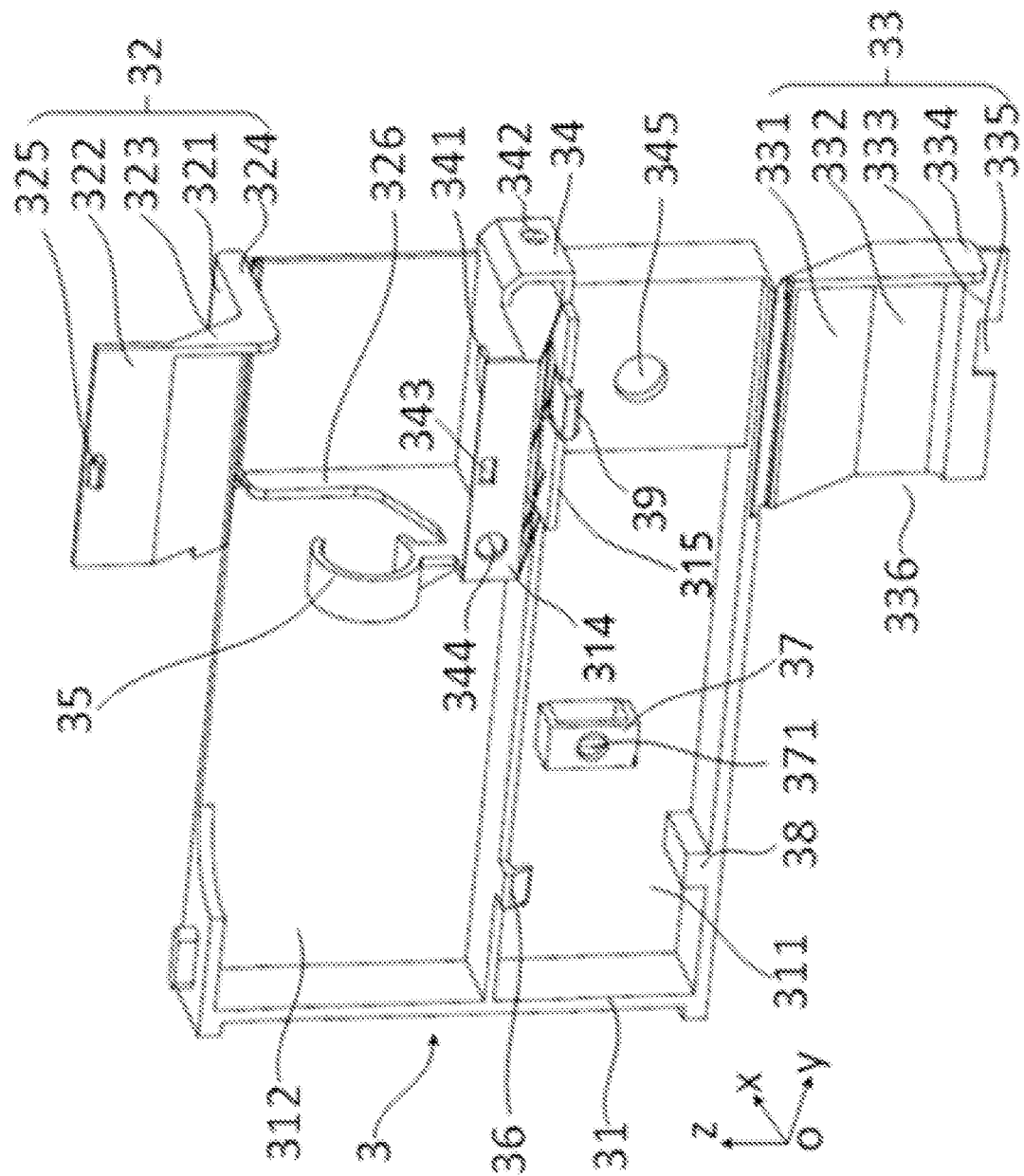
FIG. 5 is a schematic diagram of a protective cover of an end plate assembly in an open state.
Figure 6:
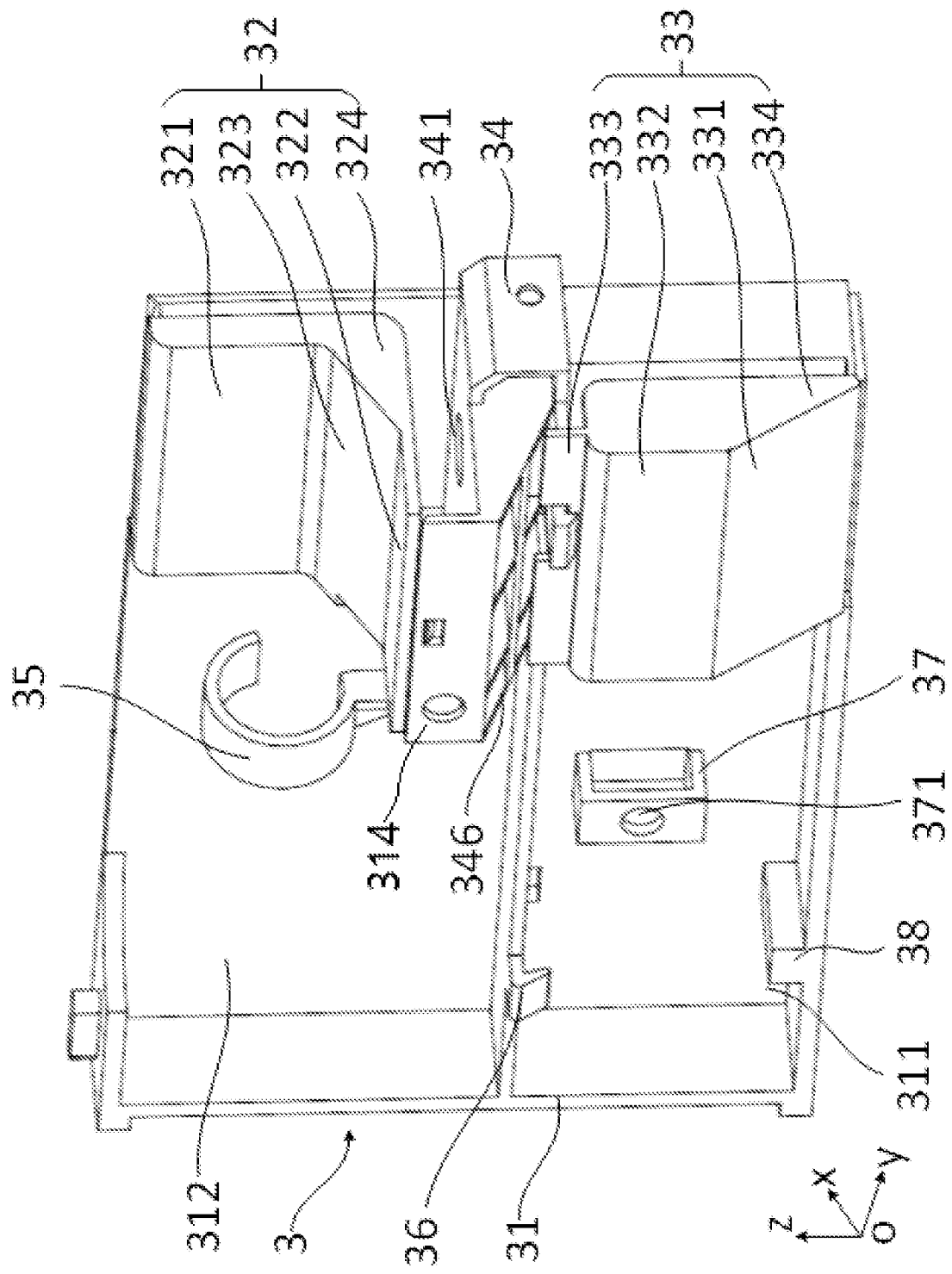
FIG. 6 is a schematic diagram of a protective cover of an end plate assembly in a buckled state.

As shown in FIGS. 5 and 6, a buckle part is disposed between the protective cover 30 and the body plate 31 to fasten the protective cover 30 to the body plate 31 when the buckle part is rotated to a buckled state. Therefore, the protective cover 30 can be more securely fastened to the body plate 31. For example, when the battery pack 100 is used in a vehicle 200 shown in FIG. 18, the protective cover 30 can be prevented from being opened when the battery pack 100 is under shock or vibration. This improves insulation performance of the battery pack 100, thereby improving use safety of the battery pack 100. Moreover, this can also prevent interference or collision with other components due to shaking after the protective cover 30 is opened.

Figure 13:
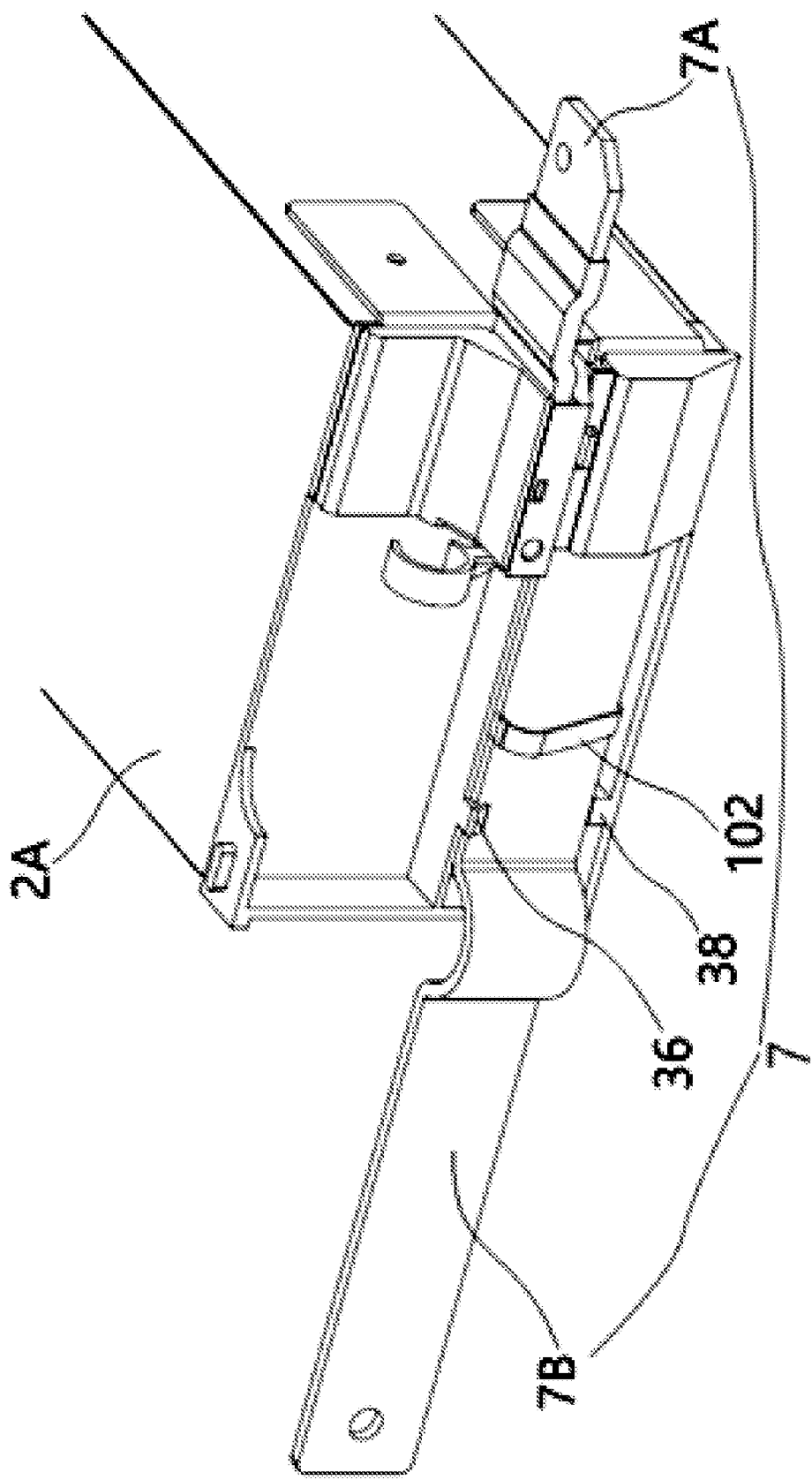
FIG. 13 is a schematic outer structure diagram of fastening a second connecting current collector to a first support portion through a third fastener.

At least one battery module 2 may be provided as required. In some embodiments, the battery pack 100 may include a plurality of battery modules 2 and at least one connecting current collector 7, and two ends of the connecting current collector 7 are electrically connected to output current collectors 22 of two battery modules 2 to connect the battery modules 2 in series, parallel, or both series and parallel, so as to implement the required electric performance. As shown in FIGS. 4, 5, and 13, an opening 336 is provided on a first side of the protective cover 30 along the second direction of the battery pack 100, closure is implemented between a second side of the protective cover 30 along the second direction of the battery pack 100 and the body plate 31, and the opening 336 forms a channel for leading out the connecting current collector 7. The "closure" mentioned herein does not mean sealing, but means covering a gap formed between the protective cover 30 and the body plate 31.

Figure 2:
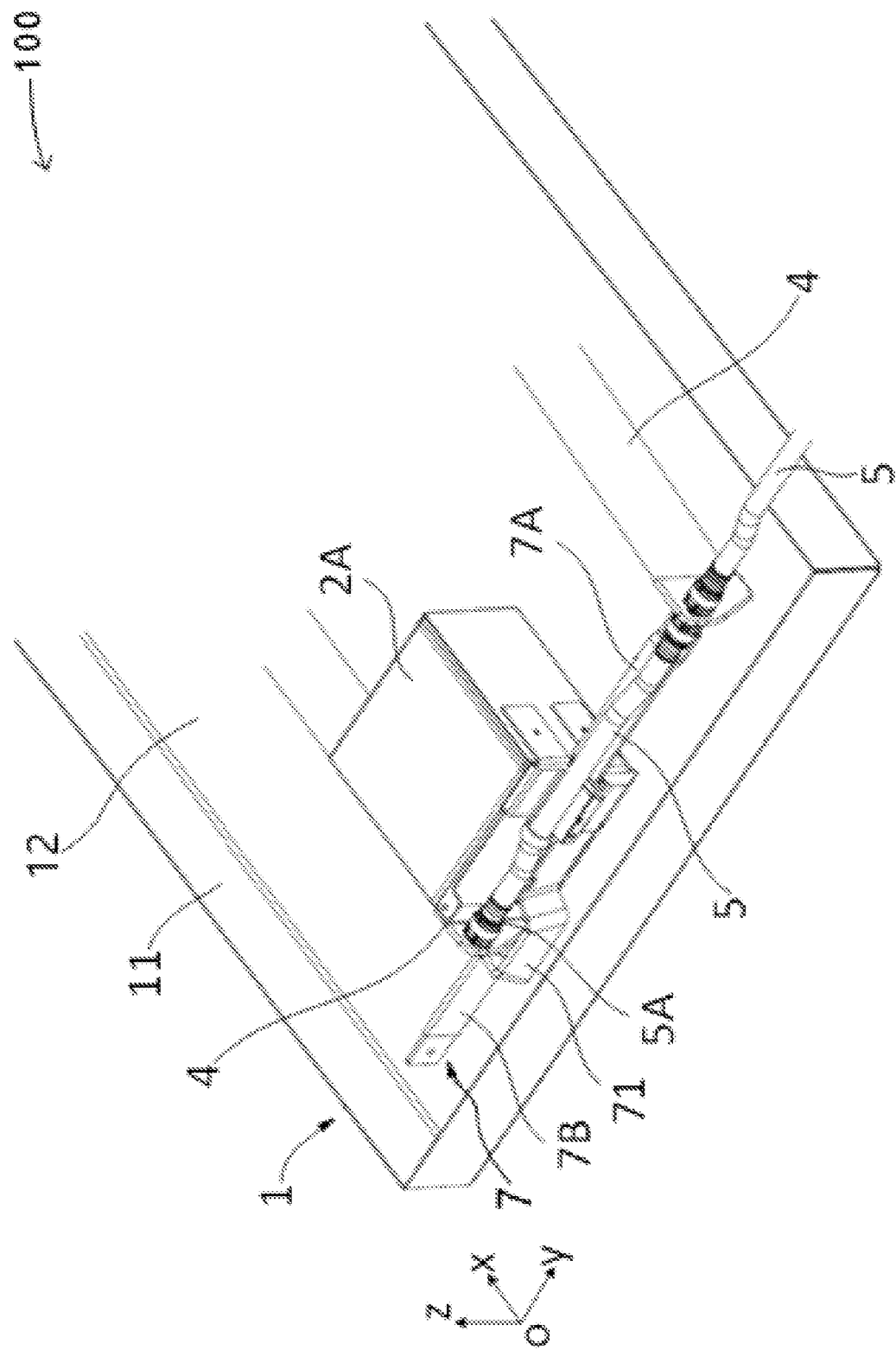
FIG. 2 is a space diagram of some structures of the battery pack in FIG. 1.

As shown in FIGS. 2 and 13, one battery cell assembly 2A is connected to two connecting current collectors 7 at the same time. The two connecting current collectors 7 include a first connecting current collector 7A and a second connecting current collector 7B. The first connecting current collector 7A and the second connecting current collector 7B are separately led out from two protective covers 30 disposed up and down.

This structure can not only reserve a channel for leading out the connecting current collector 7 between the protective cover 30 and the body plate 31, but also reliably cover a coverage area of the connecting current collector 7 at a part where the connecting current collector 7 is not led out. Therefore, effective protection can be provided for the connecting current collector 7.

As shown in FIGS. 3 and 4, the battery cell assembly 2A includes two layers of battery cells 20 stacked along the third direction (z direction), and adjacent battery cells 20 may be fastened by coating with an adhesive. Two output current collectors 22 are provided, including a first output current collector 22A and a second output current collector 22B disposed on an end of a first layer of battery cells 20 and an end of a second layer of battery cells 20 close to the end plate assembly 3, respectively, and the first output current collector 22A is on top of the second output current collector 22B.

Based on this structure, two protective covers 30 are provided, including a first protective cover 32 and a second protective cover 32. The first protective cover 32 is rotatably connected to a first end of the body plate 31 along the third direction, that is, a top end, to cover at least a part of the first output current collector 22A in a buckled state. The second protective cover 33 is rotatably connected to a second end of the body plate 31 along the third direction, that is, the bottom end, to cover at least a part of the second output current collector 22B in a buckled state. The first protective cover 32 and the second protective cover 33 can be oppositely opened outward in the third direction.

This arrangement is applicable to a structure that the two layers of battery cells 20 are disposed in the third direction. The two output current collectors 22 are covered by the first protective cover 32 and the second protective cover 33 that are independent of each other. This can increase a creepage distance between the two output current collectors 22, thereby improving insulation reliability. Moreover, this can reduce a volume of each protective cover 30, thereby facilitating processing and assembly.

Specific structures of the first protective cover 32 and the second protective cover 33 are detailed below.

Specifically, as shown in FIGS. 5 and 6, the first protective cover 32 includes a first plate 321 and a second plate 322. The first plate 321 and the second plate 322 are connected to form an L-shaped structure. The first plate 321 is rotatably connected to the top end of the body plate 31, and the second plate 322 covers a third portion 223 of the first output current collector 22A and an end of the first connecting current collector 7A to which the third portion 223 is connected. To improve structural strength of the first protective cover 32, a first reinforcement portion 323 is disposed on an outer side of a junction between the first plate 321 and the second plate 322.

An opening 322 is formed between the first plate 321 and the body plate 31 for leading out the first connecting current collector 7A. On this basis, to optimize insulation protection performance, a third plate 324 is connected to an outer end of the first plate 321 in the second direction, to seal an outer gap between the first plate 321 and the body plate 31. Further, as shown in FIG. 5, a fourth plate 326 is disposed on an inner side of the first protective cover 32 in the second direction. The fourth plate 326 is configured to seal a gap between the inner side of the first protective cover 32 and the body plate 31 in the second direction. The first buckle 35 may be connected to an outer end of the fourth plate 326 in the first direction. In this way, no additional support structure is required for the first buckle 35, and a distance between the first buckle 35 and a joint 5A can be increased as much as possible, so that supporting points are evenly disposed, to optimize a fastening effect of a connection pipe 5.

To fasten the first protective cover 32 to the body plate 31, as shown in FIGS. 5 and 6, a first hook 325 is disposed at an inner end of the second plate 322 of the first protective cover 32, a first extension plate 314 perpendicular to the first direction is disposed at an outer end of the body plate 31 along the first direction, and a first slot 343 is disposed on the first extension plate 314. When the first protective cover 32 is in the buckled state, the first hook 325 is locked into the first slot 343 for fastening.

Still referring to FIGS. 5 and 6, the second protective cover 33 includes a fifth plate 331 and a sixth plate 333, and the fifth plate 331 is connected to the sixth plate 333. The fifth plate 331 is rotatably connected to the bottom end of the body plate 31, and is disposed in the buckled state. The sixth plate 333 covers the second portion 222 of the second output current collector 22B and an end of the second connecting current collector 7B to which the second portion 222 is connected. To improve structural strength of the second protective cover 33, a second reinforcement portion 332 is disposed on an outer side of a junction between the fifth plate 331 and the sixth plate 333.

To fasten the second protective cover 33 to the body plate 31, as shown in FIGS. 5 and 6, a second slot 335 is disposed at a free end of the sixth plate 333 of the second protective cover 33, a second extension plate 315 perpendicular to the third direction is disposed at the outer end of the body plate 31 along the first direction, and a second hook 39 is disposed on the second extension plate 315. When the second protective cover 33 is in the buckled state, the second hook 39 is locked into the second slot 335 for fastening.

As shown in FIGS. 2 and 3, the battery pack 100 may include: a plurality of connecting current collectors 7 and a plurality of battery modules 2. The plurality of connecting current collectors 7 include a first connecting current collector 7A, configured to connect first output current collectors 22A of the two battery modules 2; and a second connecting current collector 7B, configured to connect second output current collectors 22B of the two battery modules 2. The first connecting current collector 7A and the second connecting current collector 7B are led out in opposite polarities of the second direction.

This structure is convenient for the battery module 2 to connect to battery modules 2 located on both sides along the second direction, and can connect the battery modules 2 when the connecting current collector 7 is shortened, so that arrangement of the battery modules 2 in the case assembly 1 is more optimized. Moreover, it can also prevent the first connecting current collector 7A and the second connecting current collector 7B from being conductive, thereby improving insulation reliability of the battery pack 100.

Specific structures and fastening methods of the first output current collector 22A and the second output current collector 22B are described below.

As shown in FIG. 3, the battery pack 100 may further include a first fastener 8, such as a screw, a bolt, or a rivet. The first output current collector 22A includes a first portion 221, a second portion 222, and a third portion 223. The first portion 221 is connected to an electrode terminal 242 of the first layer (upper layer) of battery cells 20 adjacent to the end plate assembly 3. The second portion 222 is connected to an end of the first portion 221 close to the end plate assembly 3 along the first direction (x direction), and abuts against an outer surface of the body plate 31. The third portion 223 is connected to one end of the second portion 222 close to the second output current collector 22B along the third direction (z direction) and extends outward horizontally, that is, the third portion 223 is connected to a bottom end of the second portion 222. For example, the first output current collector 22A may be formed by bending a metal plate structure.

As shown in FIG. 13, the third portion 223 and the first connecting current collector 7A are stacked and fastened to the body plate 31 through the first fastener 8 along the third direction (z direction), so that the first connecting current collector 7A extends in a plane perpendicular to the third direction (z direction). Preferably, the first connecting current collector 7A is stacked on the third portion 223 for easy assembly and secure fastening of the first output current collector 22A.

Referring to FIG. 2, the first connecting current collector 7A extends in a plane perpendicular to the third direction (z direction), and can extend at least partially along the outer surface of the body plate 31. This can reduce space occupied by the first connecting current collector 7A outside the body plate 31, so that the battery pack 100 has a more compact structure, increasing space utilization of the battery pack 100 and improving energy density of the battery pack 100.

As shown in FIG. 3, the battery pack 100 may further include a second fastener 9, such as a screw, a bolt, or a rivet. The second output current collector 22B includes a first portion 221 and a second portion 222. The first portion 221 is connected to an electrode terminal 242 of the second layer (lower layer) of battery cells 20 adjacent to the end plate assembly 3. The second portion 222 is connected to an end of the first portion 221 close to the end plate assembly 3 along the first direction (x direction), and abuts against an outer surface of the body plate 31. For example, the second output current collector 22B may be formed by bending a metal plate structure.

The second portion 222 and the second connecting current collector 7B are stacked and fastened to the body plate 31 through the second fastener 9 along the first direction, so that the second connecting current collector 7B extends in a plane perpendicular to the first direction (x direction). Preferably, the second connecting current collector 7B is stacked on the second portion 222 for easy assembly and secure fastening of the first output current collector 22A.

Referring to FIG. 2, the connection pipe 5 configured to connect the cooling plates 4 is disposed outside the first protective cover 32 and extends along the second direction (y direction). Therefore, extending the second connecting current collector 7B in a plane perpendicular to the first direction (x direction) can prevent the second connecting current collector 7B and the second fastener 9 from occupying an additional space outside the body plate 31 in the first direction (x direction), and can reduce a thickness of the first protective cover 32 along the first direction, and can make the connection pipe 5 closer to the body plate 31, so that structural arrangement at an end of the battery cell assembly 2A is more compact, the space utilization of the battery pack 100 is increased, and the energy density of the battery pack 100 is improved.

As shown in FIGS. 5 and 6, a fastening base 34 is provided at a location, on the body plate 31, at which the output current collector 22 is disposed. The fastening base 34 is provided with a second mounting hole 341 and a third mounting hole 345, for example, threaded holes. The second mounting hole 341 is configured to fasten the first output current collector 22A, and the third mounting hole 345 is configured to fasten the second output current collector 22B. The body plate 33 is formed through injection molding. Therefore, to improve connection strength between the second mounting hole 341 and the first fastener 8 and between the third mounting hole 345 and the second fastener 9, a metal insert may be disposed in the second mounting hole 341 and the third mounting hole 345, and a threaded hole is disposed in the insert.

Figure 7:
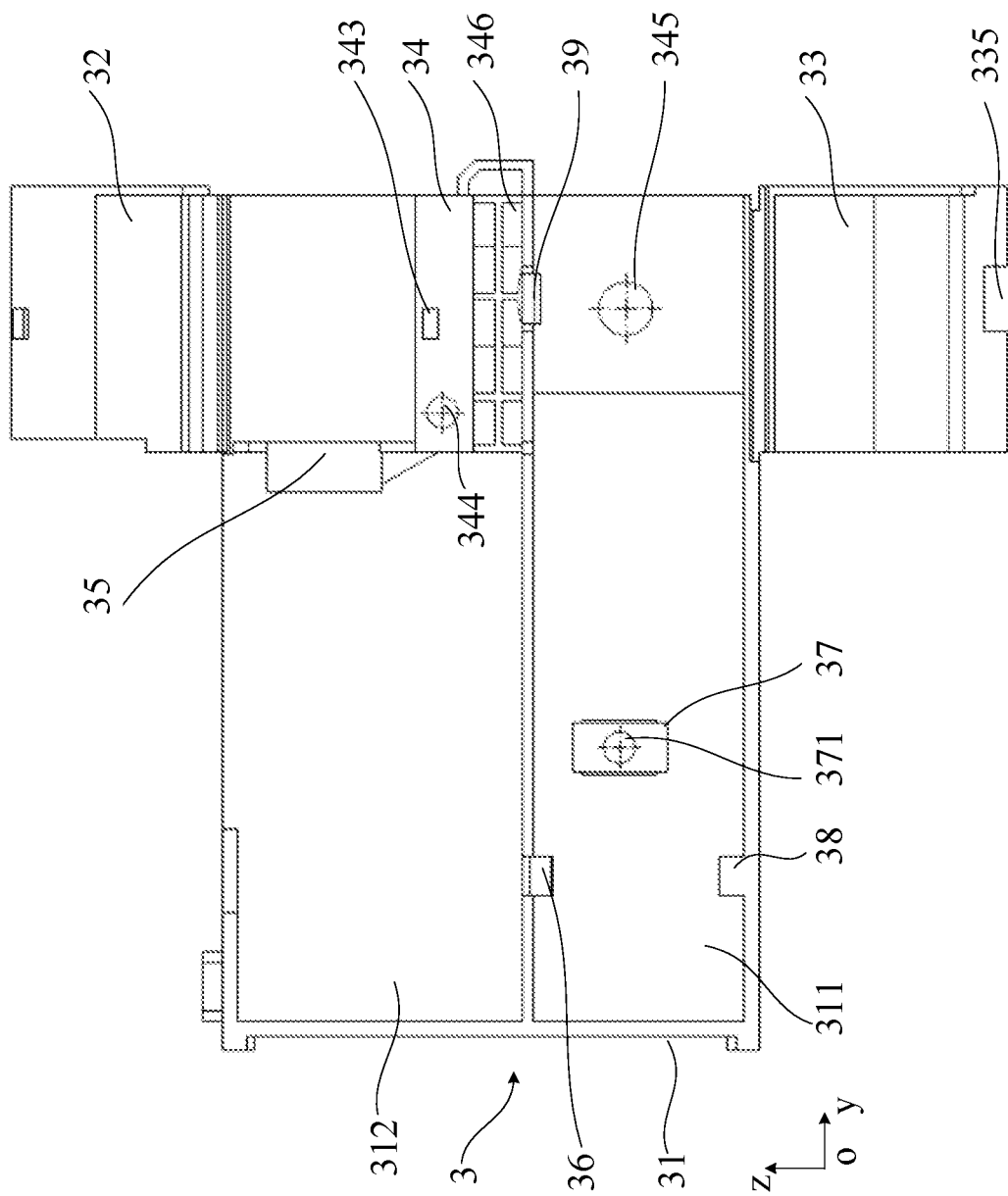
FIG. 7 is a main view of a protective cover in an open state in some embodiments of an end plate assembly.

In addition, an outer end of the fastening base 34 in the second direction protrudes from the first portion 221 of the output current collector 22, and a fourth mounting hole 342 is provided in the protruding part. The protruding part may be set as a cavity structure, to fasten and protect other metal parts and structures of the battery module 2 at corresponding locations. In addition, a fifth mounting hole 344 is provided in the first extension plate 314, to fasten and protect other metal parts and structures of the battery module 2 at corresponding locations. As shown in FIG. 7, a weight reduction groove 346 is provided at a bottom of the first extension plate 314.

As shown in FIGS. 2 to 4, the battery pack 100 of this application may further include a cooling plate 4 and a connection pipe 5. The cooling plate 4 abuts against a surface of the battery cell assembly 2A facing away from the electrode terminals 242 of the battery cell 20, covers each battery cell 20 in the first direction, and is configured to cool each battery cell 20 of the battery cell assembly 2A. The connection pipe 5 is connected to the cooling plate 4 to supply cooling fluid to the cooling plate 4, and the connection pipe 5 is on a side of the body plate 31 facing away from the battery module 2.

Specifically, a cooling runner (not shown in the figure) is disposed in the cooling plate 4, and there are one or more cooling runners. There are at least two cooling plates 4. The connection pipe 5 is connected to the cooling runner to connect the cooling plates 4. Each end of the connection pipe 5 may be detachably connected to the cooling plate 4 through a joint 5A. Further, a liquid inlet pipe and a liquid outlet pipe may be additionally disposed outside the case assembly 1, and two ends of the connection pipe 5 are respectively connected to the liquid inlet pipe and the liquid outlet pipe to circulate cooling liquid inside the cooling plate 4 and optimize a cooling effect in the battery pack 100.

As shown in FIG. 1, all battery cells 20 are laid flat in the case 11, that is, the largest side surface A is approximately parallel to the bottom surface of the case 11, and are stacked into at least two layers in the third direction. In this case, if a prior-art manner of disposing the cooling plate 4 at the bottom of the case 11 is used, cooling rates at all layers of battery cells 20 are different. For this reason, the cooling plate 4 is vertically disposed and abuts against a surface of each battery cell 20 facing away from the electrode terminal 242 in this application, so that all the layers of battery cells 20 can be evenly cooled, to reduce a temperature difference among all the layers of battery cells 20 and improve working performance of the battery pack 100.

The connection pipe 5 is relatively long. Therefore, to securely fasten the connection pipe 5 and minimize shaking, the end plate assembly 3 further includes a first buckle 35. The first buckle 35 and the body plate 31 are integrally formed through, for example, injection molding, to fasten the connection pipe 5. This type of end plate assembly also integrates the function of fastening the connection pipe 5, saving the need to install a separate buckle after the connection pipe 5 is installed. This can reduce the risk of failure in multi-part assembly, thereby increasing reliability of an overall structure of the battery pack 100 to prevent the connection pipe 5 from shaking during driving. This can also simplify an assembly process of the battery pack 100 and improve assembly efficiency of the battery pack 100.

Figure 8:
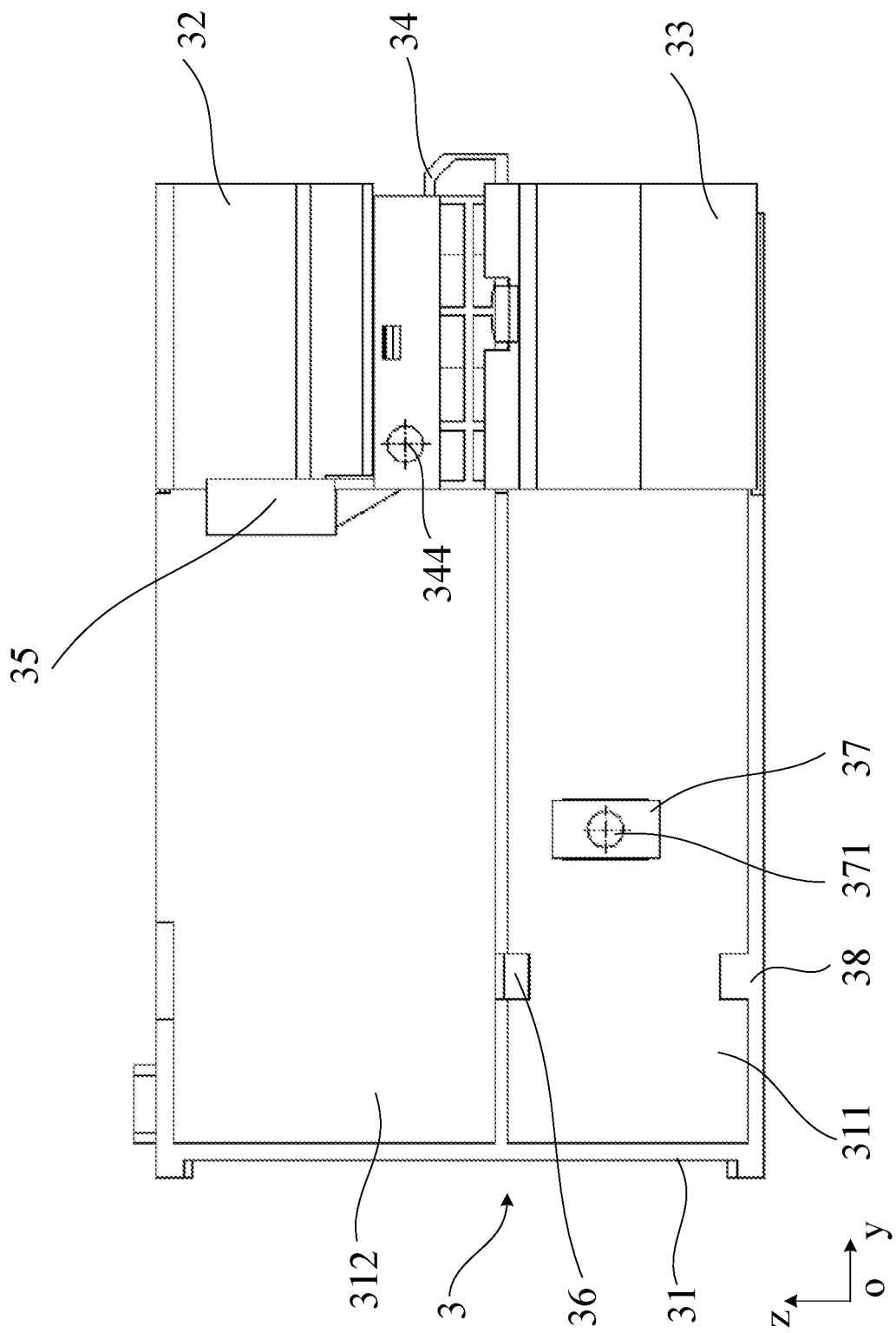
FIG. 8 is a main view of a protective cover of an end plate assembly in a buckled state.
Figure 9:
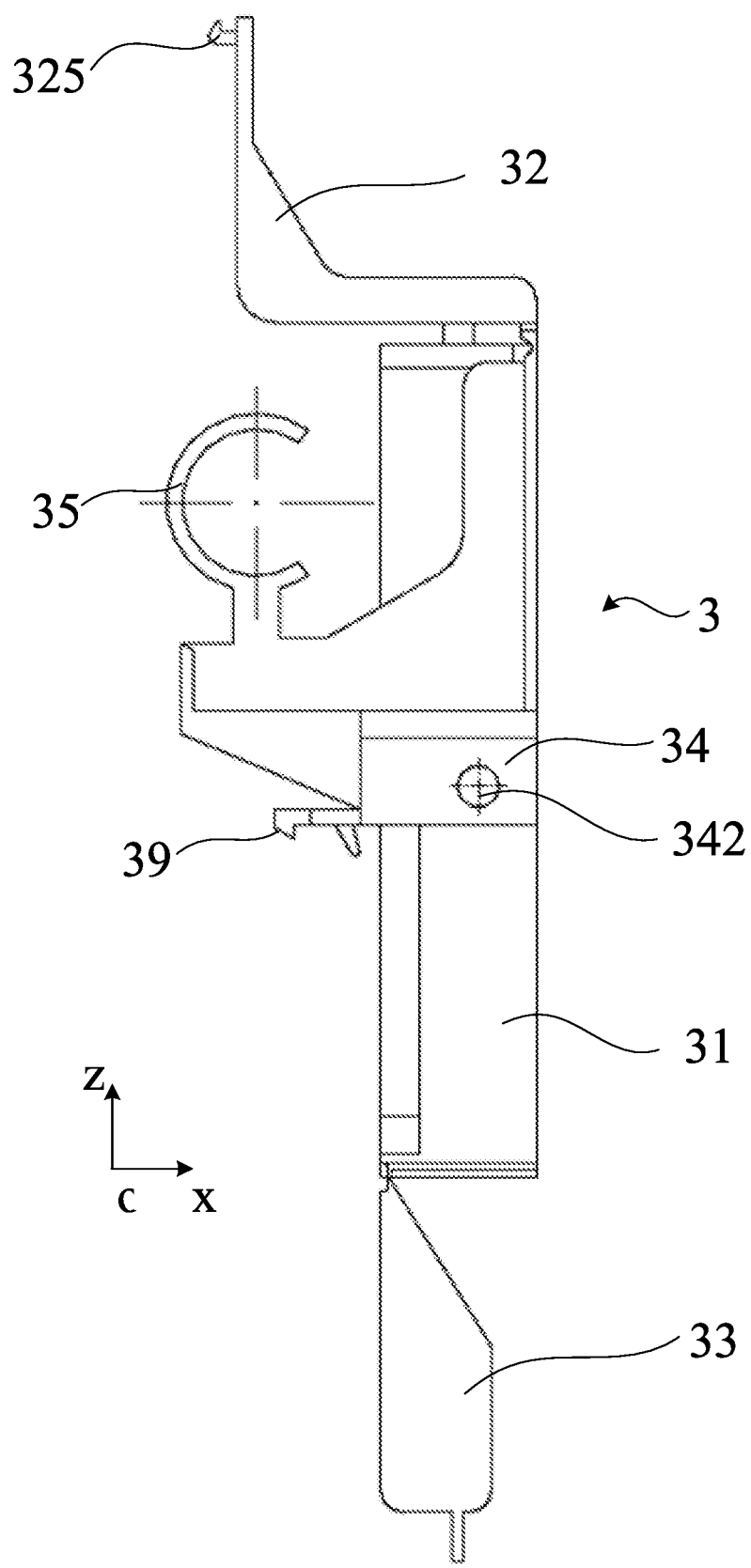
FIG. 9 is a side view of a protective cover of an end plate assembly in an open state.
Figure 10:
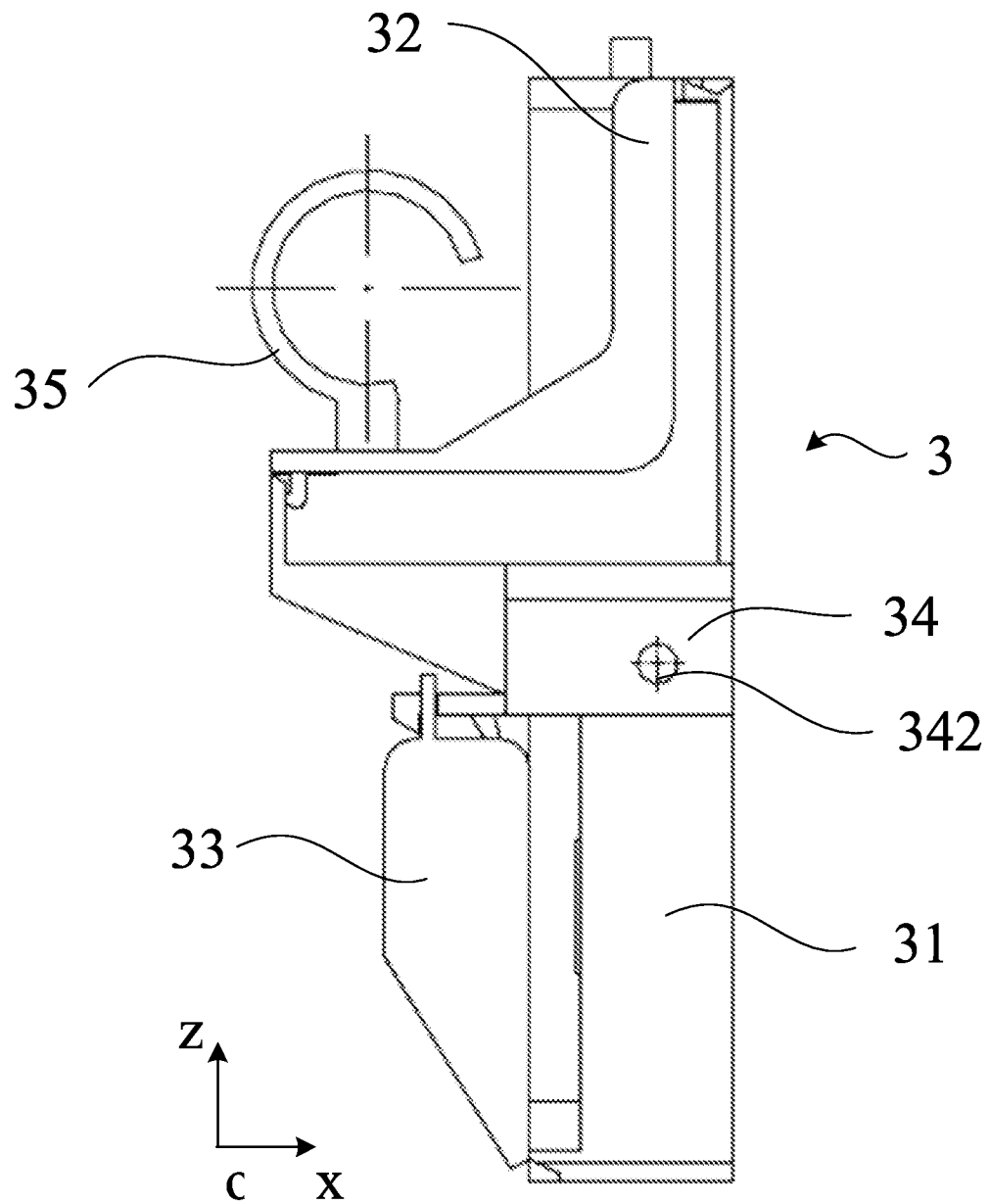
FIG. 10 is a side view of a protective cover of an end plate assembly in a buckled state.

As shown in FIGS. 7 and 8, the first buckle 35 is disposed on the body plate 31 along the second direction (y direction), and on a side of the protective cover 30 facing away from the output current collector 22. As shown in FIGS. 9 and 10, the protective cover 30 is of an L-shaped structure as a whole. The connection pipe 5 extends in the second direction (y direction) and passes through a space enclosed by an outer L-shaped structure of the protective cover 30. During assembly, the protective cover 30 may be set to the buckled state first, and then the connection pipe 5 may be inserted into the first buckle 35.

This structure can reduce a thickness of the first protective cover 32 in the first direction, and make the connection pipe 5 closer to the body plate 31, so that structural arrangement at an end of the battery cell assembly 2A is more compact, the space utilization of the battery pack 100 is increased, and the energy density of the battery pack 100 is improved.

As shown in FIG. 5, the first buckle 35 is of an arc structure and is more than a half arc. The connection pipe 5 may be inserted from an opening of the first buckle 35, or may pass through from a side of the first buckle 35 in the second direction. The opening of the first buckle 35 faces the body plate 31. This can prevent the connection pipe 5 from falling out under shaking and shock, to improve fastening security. This also allows the connection pipe 5 occupy as much space at the inner side of the first buckle 35 as possible, to reduce space occupied by the connection pipe 5 at an outer side of the body plate 31 in the first direction.

As shown in FIGS. 3 and 4, the battery pack 100 may further include a plurality of connecting current collectors 7 and a plurality of battery modules 2, and the connecting current collector 7 is configured to electrically connect output current collectors 22 of two battery modules 2. The cooling plate 4 is provided with a notch 41 at a location through which the connecting current collector 7 passes, a bending portion 71 is disposed at a location, on the connecting current collector 7, corresponding to the cooling plate 4, and the bending portion 71 passes through the notch 41. For example, the bending portion 71 may be of an arc shape. In this embodiment, the bending portion 71 is disposed on the second connecting current collector 7B. This structure can not only reduce space occupied by the connecting current collector 7B on an outer side of the body plate 31 in the first direction, but also mitigate stress concentration of the connecting current collector 7B.

Further, as shown in FIGS. 3 and 4, the battery pack 100 in this application may further include a plurality of connecting current collectors 7 and a plurality of battery modules 2, and the connecting current collector 7 is configured to electrically connect output current collectors 22 of two battery modules 2. A first groove 311 is provided in a surface of the body plate 31 facing away from the battery module 2, at least a part of one connecting current collector 7 is located within the first groove 311, and the end plate assembly 3 further includes: a second buckle 36, disposed on a side wall of the first groove 311 to fasten the connecting current collector 7 to the body plate 31.

Specifically, as shown in FIG. 5, a first groove 311 and a second groove 312 are provided on the body plate 31 from bottom to top along the third direction to reduce a weight of the body plate 31. The second connecting current collector 7B is disposed in the first groove 311. The second buckle 36 may be disposed on a spacer plate between the first groove 311 and the second groove 312, so as to implement buckling after the second connecting current collector 7B is installed, to fasten the second connecting current collector 7B.

Figure 12:
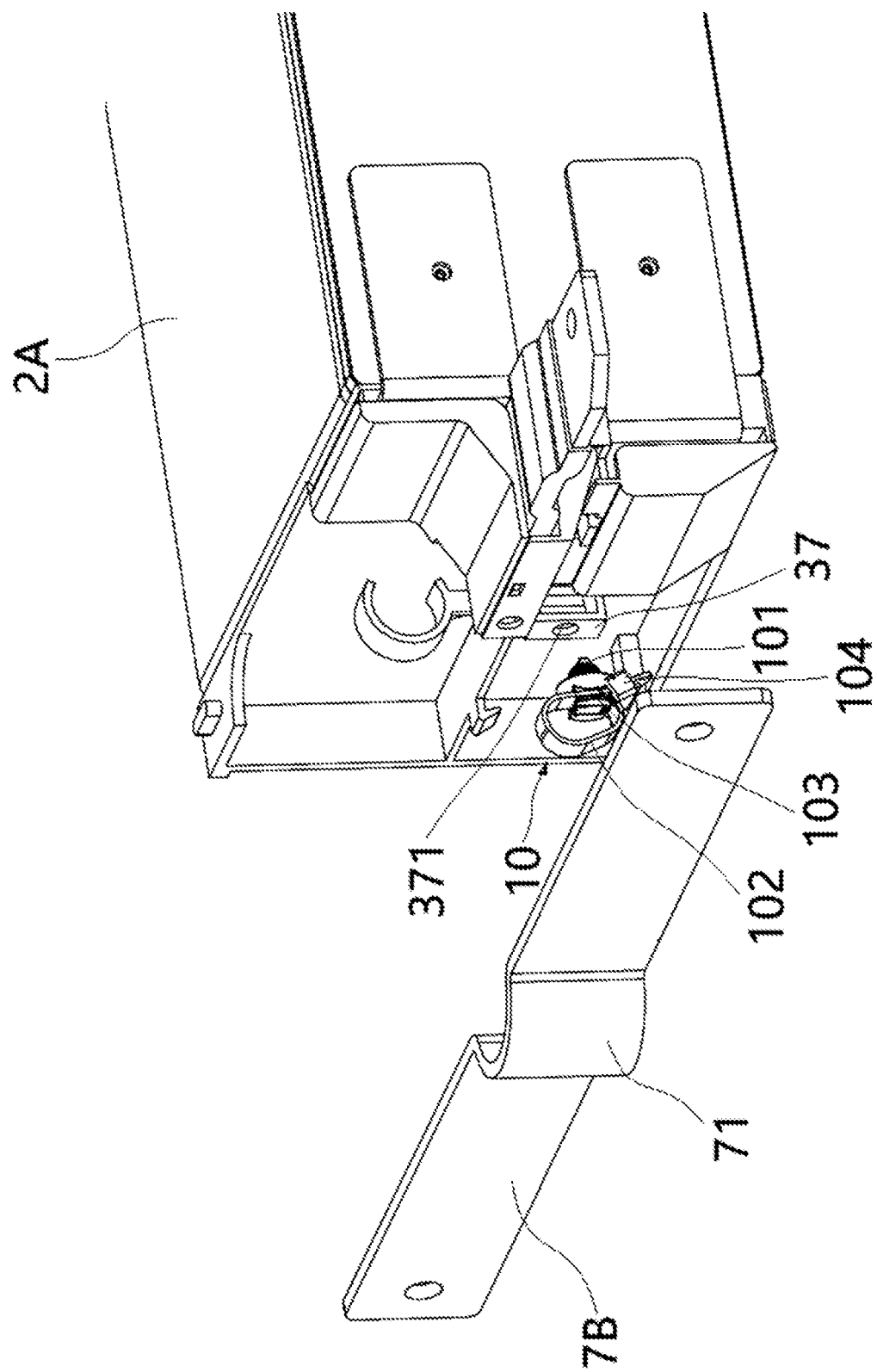
FIG. 12 is a schematic exploded view of fastening a second connecting current collector to a first support portion through a third fastener.

As shown in FIGS. 5 and 6, the end plate assembly 3 further includes a first support portion 37, disposed on an inner wall of the first groove 311 perpendicular to the first direction, and configured to limit a location of the connecting current collector 7 in the first direction. For example, the first groove 311 may be bent into a U-shaped structure from a plate-like structure, two free ends of the U-shaped structure are fastened to the body plate 31, and a first mounting hole 371 is provided in a bottom of the U-shaped structure. The end plate assembly 3 further includes a third fastener 10. As shown in FIG. 12, the third fastener 10 is, for example, a screw, a bolt, a rivet, or an undercut, and is configured to fasten the connecting current collector 7 to the first support portion 37.

As shown in FIGS. 12 and 13, the third fastener 10 includes an undercut 101 and a tie 102. A fastening portion 103 is disposed around the tie 102. The fastening portion 103 is connected to the top of the undercut 101. A sliding sleeve 104 is disposed on the tie 102 so that a free end of the tie 102 passes through the sliding sleeve 104, and a size of a fixed loop may be adjusted by pulling the free end of the tie 102. During assembly, the connecting current collector 7 is routed through the fixed loop formed by the tie 102 first, then the undercut 101 is fastened to the first mounting hole 371, the connecting current collector 7 is fastened by pulling the free end of the tie 102, and finally an excess part of the free end of the tie 102 is removed.

As shown in FIGS. 5 and 6, the end plate assembly 3 further includes a second support portion 38, disposed on an inner wall on at least one side of the first groove 311 along the third direction. The connecting current collector 7 abuts against the second support portion 38 in the third direction. The second support portion 38 is configured to limit a location of the connecting current collector 7 in the third direction. For example, the second support portion 38 may be a boss disposed on a bottom surface of the second groove 311 along the third direction, and a bottom surface of the connecting current collector 7 abuts against the second support portion 38. The second support portion 38 and the second buckle 36 are disposed on opposite wall surfaces of the second groove 311 in the third direction, so that the connecting current collector 7 is subject to even stress after being fastened. The second support portion 38 is disposed, so that a wall thickness of the body plate 31 at an outer periphery of the first groove 311 can be uniformly contracted during an injection cooling process, to reduce a degree of deformation.

Figure 11:
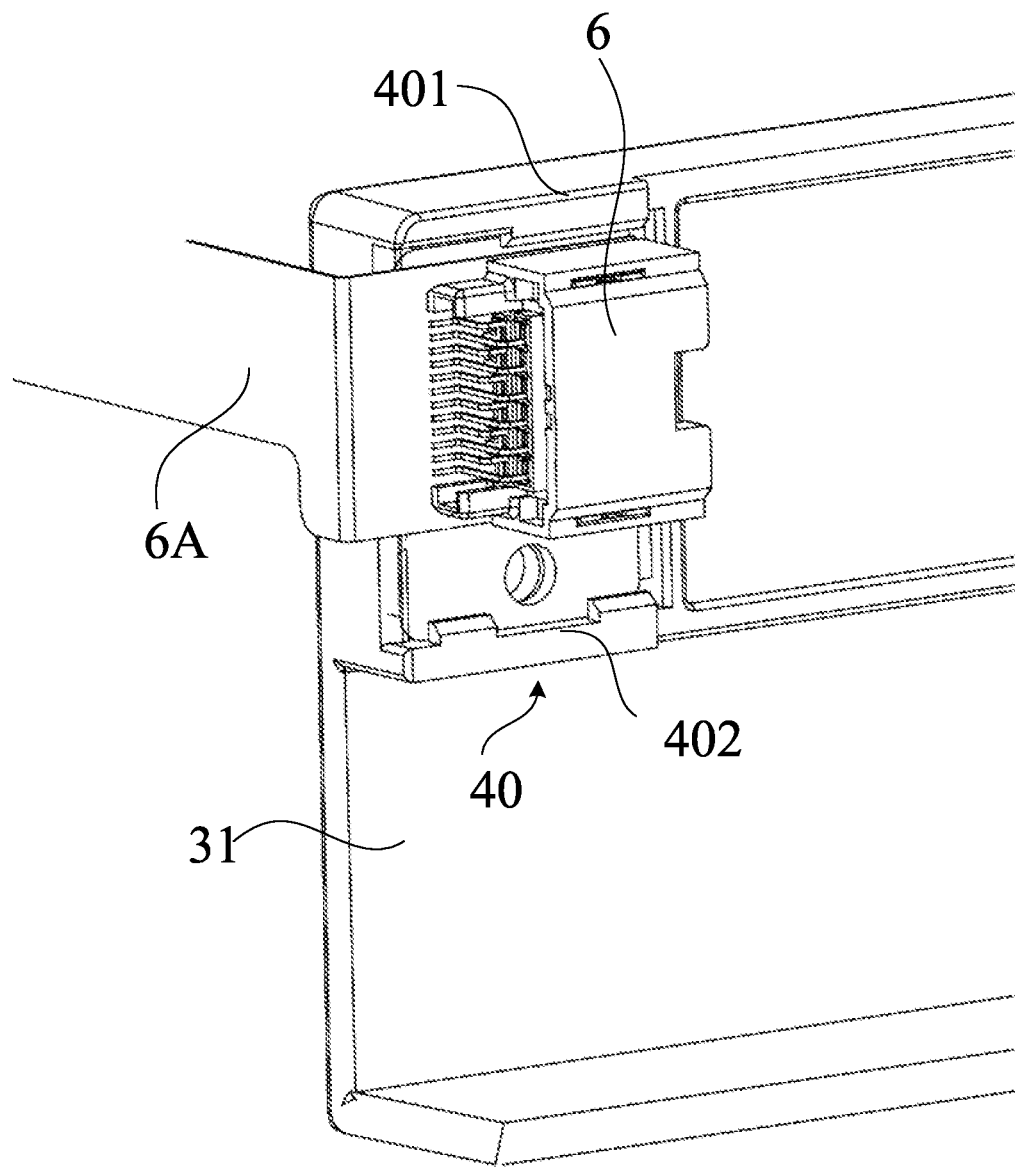
FIG. 11 is a schematic structural diagram of some embodiments of fastening a connector on an end plate assembly.

As shown in FIG. 11, the battery module 2 further includes a connector 6 and a lead-out harness 6A, and the connector 6 is connected to an end of the lead-out harness 6A; and the end plate assembly 3 further includes a third buckle 40, integrally formed with the body plate 31, for example, through injection molding, to fasten the connector 6 to the body plate 31. An end plate configured to fasten the connector 6 may be or may not be the end plate assembly 3 on which the protective cover 30 is disposed. The third buckle 40 may include a first engaging portion 401 and a second engaging portion 402 along the third direction. A channel for the connector 6 to insert into is formed between the first engaging portion 401 and the second engaging portion 402.

This type of end plate assembly also integrates the function of fastening the connector 6, saving the need to install a separate buckle after the connector 6 is installed. This can reduce the risk of failure in multi-part assembly, and prevent a pin of the connector 6 from falling out due to shaking of the lead-out harness 6A under vibration and impact, thereby increasing overall structure reliability of the battery pack 100. This also simplifies an assembly process, and improves assembly efficiency of the battery pack 100.

Figure 14:
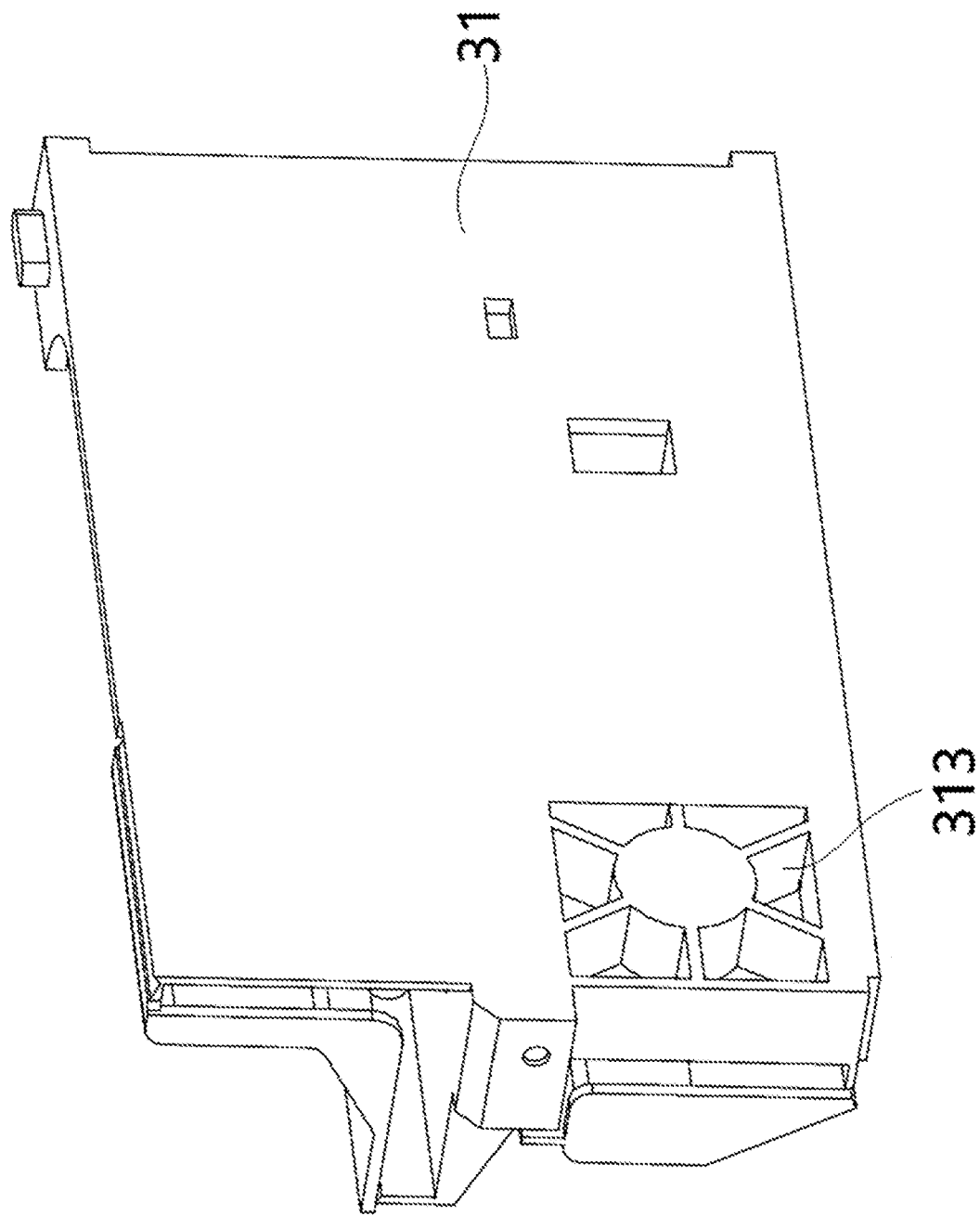
FIG. 14 is a schematic structural diagram of disposing a second groove on a side surface, of a body plate of an end plate assembly, facing towards a battery module.

As shown in FIG. 14, a second groove 313 is provided in a side surface of the body plate 31 facing towards the battery module 2, and the second groove 313 may be provided in an area with a larger thickness on the body plate 31. This structure can not only play a shrink-proof role in injection molding, but also increase an overflow space between the body plate 31 and the battery module 2 to improve bonding strength.

As shown in FIG. 18, another embodiment of this application provides a vehicle 200. In some embodiments, the vehicle 200 includes a body 201 and the battery pack 100 described in the foregoing embodiments.

The battery pack 100 is disposed within the body 201. The body 201 includes a controller 202 and an engine 203. The battery pack 100 is electrically connected to the engine 203 through the controller 202, and configured to supply electric power to the controller 202 and the engine 203. The controller 202 is configured to control the engine 203, for example, controlling start and stop, advance and retreat, and a speed of the engine 203.

According to the foregoing embodiments, the end plate assembly 3 in this application integrates a plurality of functions, thereby reducing the use of other auxiliary structures, increasing energy density of the battery pack, and improving assembly efficiency of the battery pack.

Finally, it should be noted that the foregoing embodiments are intended to illustrate instead of limiting the technical solutions of this application. Although this application is detailed with reference to the foregoing embodiments, a person of ordinary skill in the art should understand that modifications can still be made to the technical solutions described in the foregoing embodiments, or equivalent replacements can still be made to some technical features of this application, these modifications or replacements do not make essence of the corresponding technical solutions depart from the spirit and scope of the technical solutions in the embodiments of this application.

What is claimed is:

1. A battery pack, comprising:
a case assembly, comprising an accommodating cavity;
a battery module, disposed in the accommodating cavity, wherein the battery module comprises a battery cell assembly, the battery cell assembly comprises an output current collector and a plurality of battery cells arranged side by side along a first direction of the battery pack, and the output current collector is configured to output electric energy of the battery cell assembly; and
an end plate assembly, comprising a body plate and a protective cover, wherein the body plate is located at an end of the battery cell assembly along the first direction, and the protective cover is rotatably connected to the body plate, wherein at least a part of the output current collector is located between the body plate and the protective cover.

2. The battery pack according to claim 1, wherein a rotation axis of the protective cover is parallel to a second direction of the battery pack, and the rotation axis is located at an end of the body plate along a third direction, wherein
the second direction is perpendicular to the first direction, and the third direction is perpendicular to a plane defined by the first direction and the second direction.

3. The battery pack according to claim 1, wherein a first end of the output current collector is connected to an electrode terminal of a battery cell adjacent to the end plate assembly, and a second end of the output current collector is bent to a side of the body plate facing away from the battery module; and
the protective cover is disposed at an end of the body plate near the output current collector along the second direction of the battery pack, and covers the part of the output current collector bent to the side of the body plate facing away from the battery module, and the second direction is perpendicular to the first direction.

4. The battery pack according to claim 1, wherein a buckle part is disposed between the protective cover and the body plate to fasten the protective cover to the body plate when the buckle part is rotated to a buckled state.

5. The battery pack according to claim 1, wherein the protective cover and the body plate are integrally formed through injection molding, and a thinned portion at a junction of the protective cover and the body plate forms a rotatable connection of the protective cover relative to the body plate.

6. The battery pack according to claim 1, comprising:
a plurality of battery modules; and
a connecting current collector, wherein each end of the connecting current collector is electrically connected to output current collectors of a respective one of the plurality of battery modules, wherein
an opening is provided on a first side of the protective cover along the second direction of the battery pack, closure is implemented between a second side of the protective cover along the second direction of the battery pack and the body plate, the opening forms a channel for leading out the connecting current collector, and the second direction is perpendicular to the first direction.

7. The battery pack according to claim 1, wherein the battery cell assembly comprises two layers of battery cells disposed along the third direction, the output current collector comprises a first output current collector and a second output current collector disposed on an end of a first layer of battery cells and an end of a second layer of battery cells close to the end plate assembly, respectively, the third direction is perpendicular to the plane defined by the first direction and the second direction, and the second direction is perpendicular to the first direction; and
the protective cover comprises:
a first protective cover, rotatably connected to a first end of the body plate along the third direction, to cover at least a part of the first output current collector in a buckled state, and
a second protective cover, rotatably connected to a second end of the body plate along the third direction, to cover at least a part of the second output current collector in a buckled state, wherein
the first protective cover and the second protective cover are opened outward in opposite polarities of the third direction.

8. The battery pack according to claim 7, comprising a plurality of connecting current collectors and a plurality of battery modules, wherein the plurality of connecting current collectors comprise:
a first connecting current collector, configured to connect first output current collectors of the two battery modules; and
a second connecting current collector, configured to connect second output current collectors of the two battery modules, wherein
the first connecting current collector and the second connecting current collector are led out in opposite polarities of the second direction.

9. The battery pack according to claim 8, further comprising a first fastener, wherein the first output current collector comprises:
a first portion, connected to an electrode terminal of the first layer of battery cells adjacent to the end plate assembly;
a second portion, connected to an end of the first portion close to the end plate assembly along the first direction, and abutting against an outer surface of the body plate; and
a third portion, connected to one end of the second portion close to the second output current collector along the third direction and extending outward horizontally, wherein
the third portion and the first connecting current collector are stacked and fastened to the body plate through the first fastener along the third direction, so that the first connecting current collector extends in a plane perpendicular to the third direction.

10. The battery pack according to claim 8, further comprising a second fastener, wherein the second output current collector comprises:
a first portion, connected to an electrode terminal of the second layer of battery cells adjacent to the end plate assembly; and
a second portion, connected to an end of the first portion close to the end plate assembly along the first direction, and abutting against an outer surface of the body plate, wherein the second portion and the second connecting current collector are stacked and fastened to the body plate through the second fastener along the first direction, so that the second connecting current collector extends in a plane perpendicular to the first direction.

11. The battery pack according to claim 1, further comprising:
a cooling plate, abutting against a surface of the battery cell assembly facing away from the electrode terminals of the battery cell to cool each battery cell of the battery cell assembly; and
a connection pipe, connected to the cooling plate to supply cooling fluid to the cooling plate, wherein the connection pipe is on a side of the body plate facing away from the battery module, wherein
the end plate assembly further comprises a first buckle, and the first buckle is integrally formed with the body plate to fasten the connection pipe.

12. The battery pack according to claim 11, wherein the first buckle is disposed on the body plate along the second direction, and is on a side of the protective cover facing away from the output current collector, the protective cover is of an L-shaped structure on the whole, the connection pipe extends along the second direction and passes through a space formed by an outer L-shaped structure of the protective cover, and the second direction is perpendicular to the first direction.

13. The battery pack according to claim 11, wherein an opening direction of the first buckle faces the body plate.

14. The battery pack according to claim 11, comprising a plurality of connecting current collectors and a plurality of battery modules, wherein the connecting current collector is configured to electrically connect output current collectors of two battery modules; and
the cooling plate is provided with a notch at a location through which the connecting current collector passes, and a bending portion is disposed at a location, on the connecting current collector, corresponding to the cooling plate, and the bending portion passes through the notch.

15. The battery pack according to claim 1, comprising a plurality of connecting current collectors and a plurality of battery modules, wherein the connecting current collector is configured to electrically connect output current collectors of two battery modules; and
a first groove is provided in a surface of the body plate facing away from the battery module, at least a part of one connecting current collector is located within the first groove, and the end plate assembly further comprises:
a second buckle, disposed on a side wall of the first groove to fasten the connecting current collector to the body plate.

16. The battery pack according to claim 15, wherein the end plate assembly further comprises:
a first support portion, disposed on an inner wall of the first groove perpendicular to the first direction; and
a third fastener, configured to fasten the connecting current collector to the first support portion.

17. The battery pack according to claim 15, wherein the end plate assembly further comprises:
a second support portion, disposed on an inner wall on at least one side of the first groove along the third direction, wherein the second direction is perpendicular to the first direction, and the third direction is perpendicular to a plane defined by the first direction and the second direction, wherein
the connecting current collector abuts against the second support portion in the third direction.

18. The battery pack according to claim 1, wherein the battery module comprises a connector and a lead-out harness, and the connector is connected to an end of the lead-out harness; and
the end plate assembly further comprises:
a third buckle, integrally formed with the body plate to fasten the connector to the body plate.

19. The battery pack according to claim 1, wherein a second groove is provided in a side surface of the body plate facing towards the battery module.

20. A vehicle, comprising a body, and a battery pack disposed within the body, wherein the battery pack comprises:
a case assembly, comprising an accommodating cavity;
a battery module, disposed in the accommodating cavity, wherein the battery module comprises a battery cell assembly, the battery cell assembly comprises an output current collector and a plurality of battery cells arranged side by side along a first direction of the battery pack, and the output current collector is configured to output electric energy of the battery cell assembly; and
an end plate assembly, comprising a body plate and a protective cover, wherein the body plate is located at an end of the battery cell assembly along the first direction, and the protective cover is rotatably connected to the body plate, wherein at least a part of the output current collector is located between the body plate and the protective cover.

* * * * *